United States Patent
Takaku et al.

(10) Patent No.: US 7,871,539 B2
(45) Date of Patent: Jan. 18, 2011

(54) LIQUID CRYSTAL COMPOSITION, LIQUID CRYSTAL ELEMENT, REFLECTIVE DISPLAY MATERIAL, LIGHT-CONTROLLING MATERIAL, AND METHOD OF PREPARING LIQUID CRYSTAL COMPOSITION

(75) Inventors: Koji Takaku, Kanagawa (JP); Naoyuki Hayashi, Kanagawa (JP); Takashi Kato, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 71 days.

(21) Appl. No.: 12/124,534

(22) Filed: May 21, 2008

(65) Prior Publication Data
US 2008/0292817 A1  Nov. 27, 2008

(30) Foreign Application Priority Data
May 24, 2007  (JP) ............................. 2007-138062

(51) Int. Cl.
*C09K 19/00* (2006.01)
*C09K 19/06* (2006.01)
*C09K 19/52* (2006.01)
*G03F 1/1333* (2006.01)

(52) U.S. Cl. .............................. 252/299.01; 252/299.6; 252/299.61; 252/299.7; 428/1.1; 349/117; 430/20

(58) Field of Classification Search ............ 252/299.01, 252/299.6, 299.61, 299.7; 430/20, 270.1; 428/1.1; 349/117
See application file for complete search history.

(56) References Cited

U.S. PATENT DOCUMENTS
5,762,824 A * 6/1998 Kawashukuda et al. .. 252/299.1
6,660,345 B2 * 12/2003 Coates et al. ................ 428/1.1

OTHER PUBLICATIONS

Pirkl et al., "Electric-field-inducd phase transitions in frustrated cholesteric liquids crystals of negative dielectric anisotropy", The American Physical Society; Physical Review A' vol. 44, No. 12, Dec. 15, 1991; pp. 8198-8210.
White et al., "New absorptive mode reflective liquid-crystal display device", Journal of Applied Physics, vol. 45, No. 11, Nov. 1974; pp. 4718-4723.

* cited by examiner

*Primary Examiner*—Geraldina Visconti
(74) *Attorney, Agent, or Firm*—Birch, Stewart, Kolasch & Birch, LLP

(57) ABSTRACT

The present invention provides a liquid crystal composition having at least a liquid crystal and a chiral dopant, in which the chiral dopant is a compound having a liquid crystalline group of a specific structure bonded to a rigid optically active compound. The present invention provides a liquid crystal element having at least a pair of electrodes in which at least one of the electrodes is a transparent electrode, and a liquid crystal layer containing the liquid crystal composition. The present invention also provides a reflective display material and a light-controlling material having at least the liquid crystal element, and a method of preparing the liquid crystal element by adding the chiral dopant to a host liquid crystal.

12 Claims, No Drawings

LIQUID CRYSTAL COMPOSITION, LIQUID CRYSTAL ELEMENT, REFLECTIVE DISPLAY MATERIAL, LIGHT-CONTROLLING MATERIAL, AND METHOD OF PREPARING LIQUID CRYSTAL COMPOSITION

CROSS-REFERENCE TO RELATED APPLICATION

This application claims priority under 35 USC 119 from Japanese Patent Application No. 2007-138062 the disclosure of which is incorporated by reference herein.

BACKGROUND OF THE INVENTION

1. Field of Invention

The present invention relates to a liquid crystal composition, a liquid crystal element, a reflective display material, a light-controlling material, and method of preparing a liquid crystal composition.

2. Description of the Related Art

Display devices of a guest-host system in which display is carried out by change in the orientation state of a dichroic dye dissolved in a liquid crystal are capable of bright display, and are expected to serve, not only as reflective display devices, but also as systems adapted to light-controlling applications.

In this guest-host system, the dichroic dye has one light absorption axis and absorbs only light that oscillates in the direction of the light absorption axis. If the orientation of the dichroic dye can be changed to match the movement of the liquid crystal by an electric field, the direction of the light absorption axis can be controlled, and the light absorption state of a cell can be changed. Furthermore, it is known that the display contrast of a guest-host system liquid crystal element is determined by an order parameter of the dichroic dye contained in a liquid crystal composition constituting a liquid crystal layer, a host liquid crystal, or a cell structure.

Generally, when a liquid crystal composition in which a nematic liquid crystal and a dichroic dye are combined is provided between substrates that have been subjected to orientation processing, since the nematic liquid crystal exhibits a uniaxial orientation state, the dichroic dye can only absorb linearly polarized light of one of the axes. Accordingly, half of the light is transmitted and a display contrast ratio cannot be raised.

Further, even in a case where a liquid crystal composition in which a nematic liquid crystal and a dichroic dye are combined is injected between substrates that have not been subjected to orientation processing, the nematic liquid crystal exhibits a multi-domain state, and the dichroic dye can only absorb linearly polarized light of one of the axes. Accordingly, half of the light is transmitted and a display contrast ratio cannot be raised.

Meanwhile, a phase transition guest-host system which utilizes a chiral nematic phase due to combination with a chiral dopant so that the dichroic dye can absorb light of all orientations has been proposed (D. L. White and G. N. Taylor, J. Appl. Phys., Vol. 45, pp. 4718 (1974)). In this system, bright display that does not use a polarization plate becomes possible.

However, in the phase transition guest-host system, since incident light rotates following a helical structure (chiral nematic phase) (wave guide), there is the problem of a reduction in the amount of light absorbed by the dichroic dye. In order to raise the light absorption amount, it is necessary to make the refractive index anisotropy Δn of the host liquid crystal as small as possible, or shorten the helical pitch length to an extent that incident light cannot follow.

Incidentally, in a non-absorption (colorless) mode (normally white) at a time when a voltage is not applied, it is preferable that the liquid crystal has a homeotropic orientation. However, when the helical pitch length is shortened as discussed above for the purpose of raising the light absorption amount in a homeotropic orientation, the twisting power of the liquid crystal overcomes the angling power of the orientation film, and there is a problem in that, as a result of attaining a focal conic state (in which the helical axis is parallel to the substrate), the transmission rate of the non-absorption state is lowered.

It has been reported that a helical pitch length that can maintain a homeotropic orientation correlates with an elastic constant ratio $K_{33}/K_{22}$ of the host liquid crystal, and that the larger this value of the host liquid crystal is, the more the helical pitch length can be shortened (for example, Physical Review A, Vol. 44, No. 12, pp. 8198-8210 (1991)). However, this report is based on logical calculation and does not disclose any concrete measures for realization.

Furthermore, it has been considered that, in order to change the elastic constant ratio $K_{33}/K_{22}$, the only option is to change the host liquid crystal itself. As a result, it has been difficult to satisfy all of the various properties (refractive index anisotropy Δn, liquid crystal temperature range, order parameter and viscosity) that are necessary for the guest-host system, in addition to the elastic constant ratio $K_{33}/K_{22}$, and thus a new method has been demanded.

SUMMARY OF THE INVENTION

The present invention provides a liquid crystal composition that can maintain a homeotropic orientation even in a short helical pitch length and that exhibits a high order parameter value, and a preparation method thereof.

Further, the present invention provides a liquid crystal element having high display contrast, a reflective display material and a light-controlling material.

As a result of diligent research by the present inventors, it has become clear that when a rigid optically active compound having a rod-shaped liquid crystalline group is used as a chiral dopant, a homeotropic orientation can be maintained even in a short helical pitch length.

Conventionally, it has been thought that, in order to obtain a helical pitch length that can maintain a homeotropic orientation, the only option was to change the host liquid crystal itself. The fact that the above effect can be obtained by the addition of the chiral dopant is a new fact that has been discovered by the present inventors.

Furthermore, the present inventors have obtained the unexpected effect that an order parameter of a liquid crystal is improved when a rigid optically active compound having a rod-shaped liquid crystalline group is used as the chiral dopant.

The fact that the order parameter of a host liquid crystal can be raised by the chiral dopant has not been reported before (Mol. Cryst. Liq. Cryst., 1986, Vol. 141, pp. 97-106; International Publication No. WO 02/06195; and International Publication No. WO 02/06196). This fact is also a new finding that has been discovered by the present inventors.

Namely, a first aspect of the present invention is a liquid crystal composition, comprising: a liquid crystal; and a chiral dopant which is a compound in which a liquid crystalline group represented by the following Formula (1) is bonded to a rigid optically active compound:

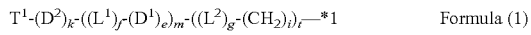   Formula (1)

wherein *1 indicates a bonding position with the optically active compound; $D^1$ and $D^2$ each independently represent an arylene group, a heteroarylene group, or a divalent cyclic aliphatic hydrocarbon group; $L^1$ and $L^2$ each represent a divalent linking group; $T^1$ represents an alkyl group, an alkoxy group, an alkoxy carbonyl group, an acyl group, an acyloxy group, a halogen atom or a cyano group; e represents an integer of from 1 to 3; f represents an integer of from 0 to 2; m represents an integer of from 1 to 3; k represents 1 or 2; g represents 0 or 1; i represents an integer of from 0 to 20; t represents an integer of from 1 to 4; the total number of groups represented by $D^1$ and $D^2$ is an integer of from 2 to 5; when e is 2 or more, the 2 or more of $D^1$ may be the same as or different from each other; when k is 2, the two groups represented by $D^2$ may be the same as or different from each other; when m is 2 or more, the 2 or more of $((L^1)_f\text{-}(D^1)_e)$ may be the same as or different from each other; when f is 2 or more, the 2 or more of $L^1$ represent different linking groups; $(g+i) \times t$ is an integer of from 1 to 40; and when t is 2 or more, the 2 or more of $((L^2)_g\text{-}(CH_2)_i)$ may be the same as or different from each other.

A second aspect of the present invention is a liquid crystal element, comprising: a pair of electrodes, at least one of the electrodes being a transparent electrode; and a liquid crystal layer provided between the pair of the electrodes, the liquid crystal layer comprising the liquid crystal composition.

A third aspect of the present invention is a reflective display material comprising a liquid crystal element, wherein the liquid crystal element is the liquid crystal element.

A fourth aspect of the present invention is a light-controlling material comprising the liquid crystal element.

A fifth aspect of the present invention is a method for forming a liquid crystal composition, comprising adding a chiral dopant to a host liquid crystal so as to make the order parameter of the liquid crystal composition higher than that of the host liquid crystal, the chiral dopant comprising a liquid crystalline group represented by Formula (1) that is bonded to a rigid optically active compound.

Further, a sixth aspect of the present invention is a liquid crystal element comprising a pair of electrodes and a liquid crystal composition provided therebetween, the method comprising: adding a chiral dopant to a host liquid crystal so as to form the liquid crystal composition having an order parameter which is higher than that of the host liquid crystal; and providing the liquid crystal composition between the pair of electrodes, such that: at least one electrode of the pair of electrodes is a transparent electrode; the chiral dopant comprises a liquid crystalline group represented by Formula (1) that is bonded to a rigid optically active compound; and the liquid crystalline group represented by Formula (1) is bonded to the rigid optically active compound such that a distance (d) between the pair of electrodes and a helical pitch (P) of the liquid crystal composition satisfy a relationship of $0.1 \leq d/P \leq 3$, when the liquid crystal composition is provided between the pair of electrodes.

DETAILED DESCRIPTION OF THE INVENTION

The present invention will be described in detail below. In the present specification " . . . to . . . " indicates a range including the numerical values indicated before and after "to" as a minimum value and a maximum value, respectively.

Liquid Crystal Composition

The liquid crystal composition of the present invention contains at least a liquid crystal and a chiral dopant. The chiral dopant is a compound in which a liquid crystalline group represented by the following Formula (1) is bonded to a rigid optically active compound. The liquid crystal composition of the present invention may also include other additives.

Hereinafter, components of the liquid crystal composition of the present invention will be explained.

Chiral Dopant

The chiral dopant in the present invention is a compound in which a liquid crystalline group represented by the following Formula (1) is bonded to a rigid optically active compound.

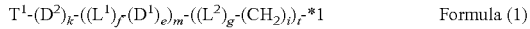   Formula (1)

In Formula (1), *1 indicates a bonding position with the optically active compound, $D^1$ and $D^2$ each independently represent an arylene group, a heteroarylene group, or a divalent cyclic aliphatic hydrocarbon group, $L^1$ and $L^2$ each represent a divalent linking group, and $T^1$ represents an alkyl group, an alkoxy group, an alkoxy carbonyl group, an acyl group, an acyloxy group, a halogen atom or a cyano group. e represents an integer of from 1 to 3, f represents an integer of from 0 to 2, m represents an integer of from 1 to 3, k represents 1 or 2, g represents 0 or 1, i represents an integer of from 0 to 20, t represents an integer of from 1 to 4, and the total number of groups represented by $D^1$ and $D^2$ is an integer of from 2 to 5.

When each of e is 2 or more, the two or more of $D^1$ may be the same as or different from each other. When each of k is 2, the two groups represented by $D^2$ may be the same as or different from each other. When m is 2 or more, the 2 or more of $((L^1)_f\text{-}(D^1)_e)$ may be the same as or different from each other. When f is 2 or more, the 2 or more of $L^1$ indicate different linking groups.

$(g+i) \times t$ is an integer of from 1 to 40. When t is 2 or more, the 2 or more of $((L^2)_g\text{-}(CH_2)_i)$ may be the same as or different from each other.

In Formula (1), $T^1\text{-}(D^2)_k\text{-}((L^1)_f\text{-}(D^1)_e)_m$- is a liquid crystalline moiety, and $\text{-}((L^2)_g\text{-}(CH_2)_i)_t$— is a moiety for linking with the optically active compound.

Accordingly, in the chiral dopant of the present invention, the liquid crystalline moiety represented by $T^1\text{-}(D^2)_k\text{-}((L^1)_f\text{-}(D^1)_e)_m$- and the rigid optically active compound are linked by the linking moiety represented by $\text{-}((L^2)_g\text{-}(CH_2)_i)_t$—.

The reason that a homeotropic orientation can be maintained in a short helical pitch length by adding such a chiral dopant to the liquid crystal has not been clarified, but it is presumed to be as follows. However, the present invention is not limited by the following presumption.

It is considered that the larger the value of the elastic constant ratio $K_{33}/K_{22}$ is, the shorter the helical pitch length can be made while still being able to maintain a homeotropic orientation. $K_{22}$ represents a twisting elastic constant, and $K_{33}$ represents a bending elastic constant. That is to say, in order to maintain a homeotropic orientation even in a short helical pitch length, it is preferable to adjust the state of the liquid crystal such that the bending elastic constant ($K_{33}$) becomes larger and the twisting elastic constant ($K_{22}$) becomes smaller.

Since the chiral dopant in the present invention has the moiety of the optically active compound which is rigid and has little interaction with the host liquid crystal, it is presumed to be loosely twisted. Meanwhile, since the chiral dopant in the present invention has the liquid crystalline moiety represented by $T^1\text{-}(D^2)_k\text{-}((L^1)_f\text{-}(D^1)_e)_m$-, it is presumed to easily interact with the host liquid crystal and, as a result, have a large bending elastic constant.

Moreover, in general, $K_{22}$ and $K_{33}$ fluctuate in conjunction with each other, and if $K_{33}$ becomes a large value, $K_{22}$ also increases. In contrast, in the chiral dopant in the present invention, it is presumed that since the liquid crystalline moiety and the moiety of the rigid optically active compound are linked, the twisting elastic constant $K_{22}$ and the bending elastic constant $K_{33}$ fluctuate independently, and the twisting elastic constant $K_{22}$ is small while the bending elastic constant $K_{33}$ is large.

The respective moieties of the chiral dopant in the present invention will be described in detail below.

Liquid Crystalline Moiety

In Formula (1), the arylene group represented by $D^1$ or $D^2$ is preferably an arylene group having 6 to 20 carbon atoms, more preferably having 6 to 10 carbon atoms. Preferable examples of the arylene groups include phenylene and naphthalene groups such as 1,4-phenylene, naphthalen-2,6-diyl, and tetrahydronaphthalen-2,6-diyl.

In Formula (1), the heteroarylene group represented by $D^1$ or $D^2$ is preferably a heteroarylene group having 1 to 20 carbon atoms, more preferably having 2 to 9 carbon atoms. Preferable examples of the heteroarylene groups include heteroarylene groups, such as pyridine ring, quinoline ring, isoquinoline ring, pyrimidine ring, pyrazine ring, thiophene ring, furan ring, oxazole ring, thiazole ring, imidazole ring, pyrazole ring, oxadiazole ring, thiadiazole ring and triazole ring and fused rings thereof, of which two hydrogen atoms are removed respectively from two carbon atom.

In Formula (1), the bivalent alicyclic hydrocarbon group represented by $D^1$ or $D^2$ is preferably a bivalent alicyclic hydrocarbon group having 3 to 20 carbon atoms, more preferably having 4 to 12 carbon atoms. Preferable examples of the bivalent alicyclic hydrocarbon groups include cyclohexanediyl, decahydronaphthalendiyl, and spiro[5.5]undecylene, more preferably cyclohexane-1,4-diyl, decahydronaphthalen-2,6-diyl, and 3,9-spiro[5.5]undecylene.

In Formula (1), the bivalent arylene group, the bivalent heteroarylene group and the bivalent alicyclic hydrocarbon group represented by $D^1$ or $D^2$ may have be substituted or unsubstituted. In Formula (1), when e, m or k is 2 or more, multiple groups $D^1$ or $D^2$ may be substituted or unsubstituted independently, and the multiple substituents may be the same as or different from each other.

Examples of the substituent groups include the following substituent groups V.

Substituent Group V

The substituent group V includes, for example, a halogen atom (for example, chlorine, bromine, iodine, or fluorine), a mercapto group, a cyano group, a carboxyl group, a phosphate group, a sulfo group, a hydroxy group, a carbamoyl group having 1 to 10 carbon atoms, preferably 2 to 8 carbon atoms, more preferably 2 to 5 carbon atoms (for example, methylcarbamoyl, ethylcarbamoyl, and morpholinocarbamoyl), a sulfamoyl group having 0 to 10 carbon atoms, preferably 2 to 8 carbon atoms, more preferably 2 to 5 carbon atoms (for example, methylsulfamoyl, ethylsulfamoyl and piperidinosulfamoyl), a nitro group, an alkoxy group having 1 to 20 carbon atoms, preferably 1 to 10 carbon atoms, more preferably 1 to 8 carbon atoms (for example, methoxy, ethoxy, 2-methoxyethoxy and 2-phenylethoxy), an aryloxy group having 6 to 20 carbon atoms, preferably 6 to 12 carbon atoms, more preferably 6 to 10 carbon atoms (for example, phenoxy, p-methylphenoxy, p-chlorophenoxy, and naphthoxy), an acyl group having 1 to 20 carbon atoms, preferably 2 to 12 carbon atoms, more preferably 2 to 8 carbon atoms (for example, acetyl, benzoyl and trichloroacetyl), an acyloxy group having 1 to 20 carbon atoms, preferably 2 to 12 carbon atoms, more preferably 2 to 8 carbon atoms (for example, acetyloxy and benzoyloxy), an acylamino group having 1 to 20 carbon atoms, preferably 2 to 12 carbon atoms, more preferably 2 to 8 carbon atoms (for example, acetylamino), a sulfonyl group having 1 to 20 carbon atoms, preferably 1 to 10 carbon atoms, more preferably 1 to 8 carbon atoms (for example, methane sulfonyl, ethane sulfonyl and benzene sulfonyl), a sulfinyl group having 1 to 20 carbon atoms, preferably 1 to 10 carbon atoms, more preferably 1 to 8 carbon atoms (for example, methanesulfinyl, ethanesulfinyl, and benzenesulfinyl), a substituted or unsubstituted amino group having 1 to 20 carbon atoms, preferably 1 to 12 carbon atoms, more preferably 1 to 8 carbon atoms (for example, amino, methylamino, dimethylamino, benzylamino, anilino, diphenylamino, 4-methylphenylamino, 4-ethylphenylamino, 3-n-propylphenylamino, 4-n-propylphenylamino, 3-n-butylphenylamino, 4-n-butylphenylamino, 3-n-pentylphenylamino, 4-n-pentylphenylamino, 3-trifluoromethylphenylamino, 4-trifluoromethylphenylamino, 2-pyridylamino, 3-pyridylamino, 2-thiazorylamino, 2-oxazorylamino, N,N-methylphenylamino, and N,N-ethylphenylamino), an ammonium group having 0 to 15 carbon atoms, preferably 3 to 10 carbon atoms, more preferably 3 to 6 carbon atoms (for example, trimethylammonium, and triethyl ammonium), a hydrazino group having 0 to 15 carbon atoms, preferably 1 to 10 carbon atoms, and more preferably 1 to 6 carbon atoms (for example, trimethyl hydrazino group), an ureido group having 1 to 15 carbon atoms, preferably 1 to 10 carbon atoms, more preferably 1 to 6 carbon atoms (for example, ureido group, and N,N-dimethylureido group), an imido group having 1 to 15 carbon atoms, and preferably 1 to 10 carbon atoms, more preferably 1 to 6 carbon atoms (for example, succinimide group), an alkylthio group having 1 to 20 carbon atoms, preferably 1 to 12 carbon atoms, more preferably 1 to 8 carbon atoms (for example, methylthio, ethylthio, and propylthio), an arylthio group having 6 to 80 carbon atoms, preferably 6 to 40 carbon atoms, more preferably 6 to 30 carbon atoms (for example, phenylthio, p-methylphenylthio, p-chlorophenylthio, 2-pyridylthio, 1-naphthylthio, 2-naphthylthio, 4-propylcyclohexyl-4'-biphenylthio, 4-butylcyclohexyl-4'-biphenylthio, 4-pentylcyclohexyl-4'-biphenylthio, and 4-propylphenyl-2-ethynyl-4'-biphenylthio), a heteroarylthio group having 1 to 80 carbon atoms, preferably 1 to 40 carbon atoms, more preferably 1 to 30 carbon atoms (for example, 2-pyridylthio, 3-pyridylthio, 4-pyridylthio, 2-quinorylthio, 2-furylthio, or 2-pyrolylthio), an alkoxycarbonyl group having 2 to 20 carbon atoms, preferably 2 to 12 carbon atoms, more preferably 2 to 8 carbon atoms (for example, methoxycarbonyl, ethoxycarbonyl, and 2-benzyloxycarbonyl), an aryloxycarbonyl group having 6 to 20 carbon atoms, preferably 6 to 12 carbon atoms, more preferably 6 to 10 carbon atoms (for example, phenoxycarbonyl), an unsubstituted alkyl group having 1 to 18 carbon atoms, preferably 1 to 10 carbon atoms, more preferably 1 to 5 carbon atoms (for example, methyl, ethyl, propyl, and butyl), a substituted alkyl group having 1 to 18 carbon atoms, preferably 1 to 10 carbon atoms, more preferably 1 to 5 carbon atoms (for example, hydroxymethyl, trifluoromethyl, benzyl, carboxyethyl, ethoxycarbonylmethyl, and acetylaminomethyl, provided that the substituted alkyl group includes an unsaturated hydrocarbon group having 2 to 18 carbon atoms, preferably 3 to 10 carbon atoms, more preferably 3 to 5 carbon atoms (for example, vinyl, ethynyl, 1-cyclohexenyl, benzylidyne, and benzylidene)), a substituted or unsubstituted aryl group having 6 to 20 carbon atoms, preferably 6 to 15 carbon atoms, more preferably 6 to 10 carbon atoms, (for example, phenyl, naphthyl, p-carboxyphenyl, p-nitrophenyl, 3,5-dichlorophenyl, p-cyanophenyl, m-fluorophenyl, p-tolyl, 4-propylcyclohexyl-4'-biphenyl, 4-butylcyclohexyl-4'-biphenyl, 4-pentylcyclohexyl-4'-biphenyl, and 4-propylphenyl-2-ethynyl-4'-biphenyl), a substituted or unsubstituted heteroaryl group having 1 to 20 carbon atoms, preferably 2 to 10 carbon atoms, more preferably 4 to 6 carbon atoms (for example, pyridyl, 5-methylpyridyl, thienyl, furyl, morpholino, and tetrahydrofurfuryl).

Those substituent groups V may have a structure in which a benzene ring or a naphthalene ring is condensed. Further, the substituent illustrated by the explanation for V explained so far may further be substituted on the substituents described above.

Among the substituent group V, the substituent groups for the bivalent arylene group, the bivalent heteroarylene group and the bivalent alicyclic hydrocarbon group represented by $D^1$ and $D^2$ are preferable alkyl group, alkoxy group, halogen atom, and a cyano group.

In Formula (1), $L^1$ represents a bivalent connecting group, preferably, an alkandiyl group, an alkenylene group, an alkynylene group, an ether group, an ester group (—COO—, —OCO—), an carbonyl group, an azo group (—CH=N—, —N=CH—), an azoxy group, or an alkyleneoxy group, and more preferably, an alkandiyl group (such as ethylene group)) an alkynylene group (such as ethynylene group), an ester group, or an alkyleneoxy group (such as methyleneoxy group).

In Formula (1), $T^1$ represents an alkyl group, an alkoxy group, an alkoxycarbonyl group, an acyl group, an acyloxy group, a halogen atom or a cyano group. $T^1$ preferably represents an alkyl group having 1 to 30 carbon atoms, more preferably having 3 to 20 carbon atoms, and still more preferably having 3 to 10 carbon atoms (such as n-propyl group, n-butyl group, n-pentyl group, n-hexyl group, hydroxymethyl, trifluoromethyl, benzyl, carboxyethyl, ethoxycarbonylmethyl, or acetylaminomethyl, provided that the substituted alkyl group includes an unsaturated hydrocarbon group having 2 to 18 carbon atoms, preferably 3 to 10 carbon atoms (for example, vinyl, ethynyl, 1-cyclohexenyl, benzylidyne, or benzylidene)); an alkoxy group having 1 to 30 carbon atoms, more preferably having 3 to 20 carbon atoms, and still more preferably having 3 to 10 carbon atoms (such as n-propyloxy group, n-butoxy group, n-pentyloxy group, or n-hexyloxy group; or a halogen atom (such as fluorine and chlorine).

The alkyl group, alkoxy group, alkoxycarbonyl group, acyl group or acyloxy group represented by $T^1$ in Formula (1) may be substituted or unsubstituted, and the substituent group may be those of the substituent groups V.

The substituent group on the alkyl group, alkoxy group, alkoxycarbonyl group, acyl group and acyloxy group represented by $T^1$ is preferably a halogen atom (in particular, chlorine or fluorine), a cyano group, a hydroxy group, an alkoxy group or an acyl group, among the substituent group V.

In Formula (1), e represents an integer of from 1 to 3, preferably 1 or 2. When e is 2 or 3, multiple groups $D^1$ may be the same as or different from each other.

In Formula (1), m represents an integer of from 1 to 3, preferably 1 or 2. When m is 2 or 3, multiple groups $D^1$ may be the same as or different from each other, and multiple groups $L^1$ may be the same as or different from each other.

In Formula (1), k is 1 or 2. When k is 2, multiple groups $D^2$ may be the same as or different from each other.

In Formula (1), f represents an integer of from 0 to 2. When f is 2 or more, multiple groups $L^1$ respectively represent different connecting groups.

In Formula (1), the total number of the groups represented by $D^1$ and $D^2$, i.e., e×m+k, is preferably an integer of from 2 to 5, more preferably an integer of from 2 to 4, and still more preferably an integer of from 2 to 3. When e and k are respectively 2 or more, two or more groups $D^1$ and $D^2$ may be the same as or different from each other; and, when m is two or more, two or more groups $((L^1)_f$-$(D^1)_e)$ may be the same as or different from each other.

Particularly favorable are the following combinations of e, f, m, and k:
(I) e=1, f=0, m=1, and k=1
(II) e=1, f=1, m=1, and k=1
(III) e=1, f=0, m=2, and k=1
(IV) e=2, f=1, m=1, and k=1
(V) e=1, f=1, m=1, and k=2
(VI) e=1, f=1, m=2, and k=1
(VII) e=2, f=1, m=1, and k=2

Linking Moiety

In Formula (1), -$((L^2)_g$-$(CH_2)_i)_t$— is a moiety for linking with the optically active compound.

In Formula (1), $L^2$ represents a bivalent connecting group, preferably, an ether group, an ester group (—COO—, —OCO—), or an carbonyl group, and more preferably, an ether group, or an ester group.

In Formula (1), g is 0 or 1

In Formula (1), i represents an integer of from 0 to 20, and preferably from 0 to 11.

In Formula (1), t represents an integer of from 1 to 4, and preferably of from 1 to 3. When t is 2 or more, the 2 or more of $((L^2)_g$-$(CH_2)_i)$ may be the same as or different from each other, and multiple instances of i may respectively be the same number or different numbers.

Herein, (g+i)×k is preferably an integer of from 1 to 40, more preferably an integer of from 1 to 30, and still more preferably an integer of from 1 to 20.

Rigid Optically Active Compound

In the present invention, the rigid optically active compound indicates a compound in which free rotation around chemical bonds within the compound is suppressed. The compound is preferably a condensed ring structure and more preferably has two or more optically active moieties. Examples of the condensed ring structure, as referred to herein, include a condensed ring structure of an aromatic ring such as naphthalene, a structure in which an aliphatic ring is condensed such as decahydronaphthalene, and the like. Herein, the optically active moiety indicates asymmetric carbon.

Further, in Formula (1), the rigid optically active compound preferably has two or more optically active moieties from the viewpoint of loosely twisting the host liquid crystal which has little interaction therewith (i.e., preventing $K_{22}$ of the elastic constant ratio from becoming large), and more preferably has three or more optically active moieties.

Examples of such a rigid optically active compound include the following compounds, but the compound of the present invention is not limited thereto. It should be noted that, in the following specific examples, the two or more optically active moieties may be anywhere, so long as they are on the condensed ring structure.

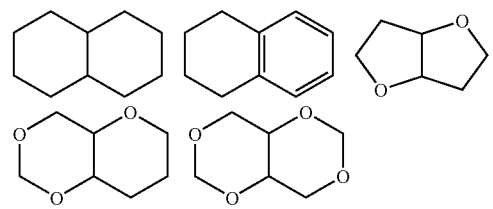

-continued

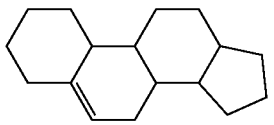

lp;lp

-continued

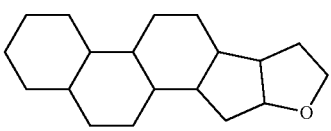

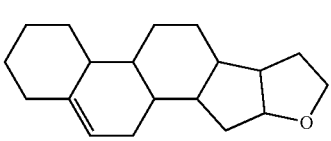

Further, in Formula (1), the rigid optically active compound is preferably a compound represented by the following Formula (2).

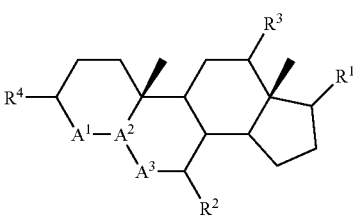

Formula (2)

In Formula (2), each of $R^1$ to $R^4$ represents a substituent group. At least one of $R^1$, $R^2$, $R^3$ and $R^4$ represents the above mentioned liquid crystalline group represented by Formula (1), and a carbon atom bound to the liquid crystalline group is asymmetric carbon. $A^1$ to $A^3$ represent a carbon atom, and $A^1$-$A^2$ and $A^2$-$A^3$ respectively represent a single bond or a double bond.

Among the substituent groups $R^1$ to $R^4$, the liquid crystalline group is preferably $R^1$ or $R^4$, and more preferably $R^4$.

In Formula (2), $R^1$ is preferably an hydrogen atom, an alkyl group having 1 to 20 carbon atoms, a halogen, a hydroxy group, an alkylamino group, an arylamino group, an alkoxy group, an aryloxy group, an alkylcarbonyloxy group, an arylcarbonyloxy group, an alkoxycarbonyl group, an aryloxycarbonyl group or an arylthio group, more preferably an alkyl group having 1 to 15 carbon atoms, and particularly preferably a branched alkyl group having 1 to 10 carbon atoms.

In Formula (2), $R^2$ and $R^3$ preferably each independently represents an hydrogen atom, an alkyl group having 1 to 20 carbon atoms, a halogen, a hydroxy group, an alkylamino group, an arylamino group, an alkoxy group, an aryloxy group, an alkylcarbonyloxy group, an arylcarbonyloxy group, an alkoxycarbonyl group, an aryloxycarbonyl group or an arylthio group, and more preferably an hydrogen atom.

Among the rigid optically active compounds described above, a cholesteric compound is particularly preferable.

Chiral Dopant represented by Formula (1)

The chiral dopant represented by Formula (1) is more preferably a chiral dopant in which the rigid optically active compound is a cholesteric compound represented by the following Formula (3).

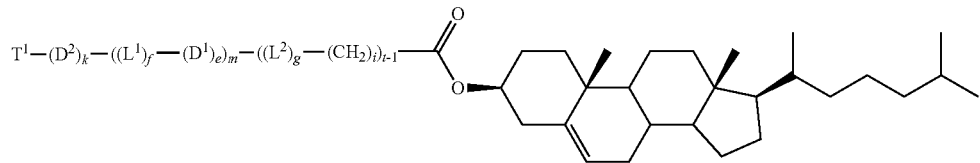

Formula (3)

In Formula (3), $D^1$, $D^2$, $L^1$, $L^2$, $T^1$, e, f, m, k, g, i and t are respectively identical with $D^1$, $D^2$, $L^1$, $L^2$, $T^1$, e, f, m, k, g, i and t in Formula (1).

Further, the chiral dopant represented by Formula (1) is more preferably a chiral dopant represented by the following Formula (4) or (5).

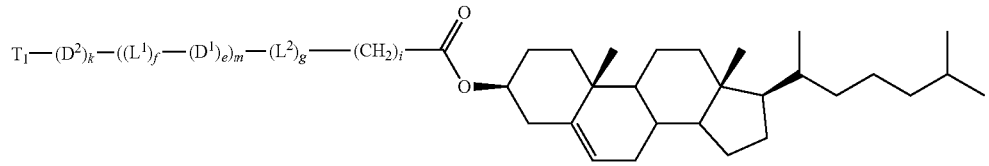

Formula (4)

In Formula (4) $D^1$, $D^2$, $L^1$, $L^2$, $T^1$, e, f, m, k, g and i are each identical with $D^1$, $D^2$, $L^1$, $L^2$, $T^1$, e, f, m, k, g and i in Formula (3).

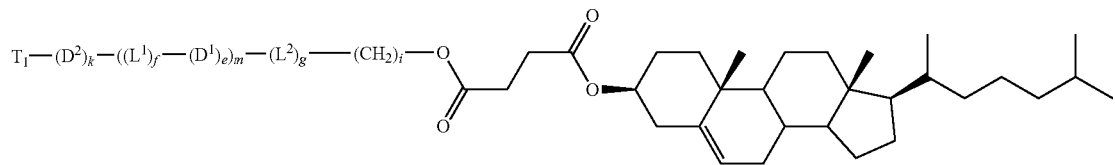

Formula (5)

In Formula (5), $D^1$, $D^2$, $L^1$, $L^2$, $T^1$, e, f, m, k, g and i are each identical with $D^1$, $D^2$, $L^1$, $L^2$, $T^1$, e, f, m, k, g and i in Formula (3).

Examples of the chiral dopant for use in the invention are listed below, but the invention is not limited thereto.

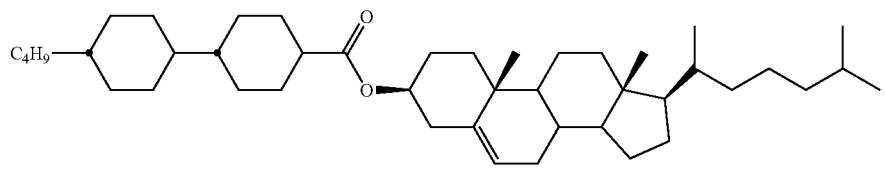

(1)

-continued
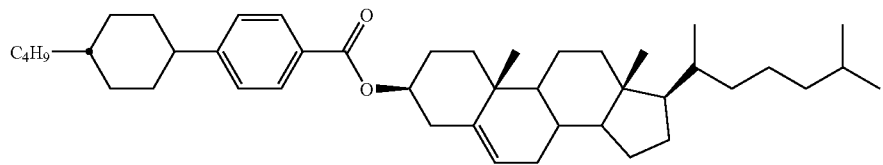
(2)
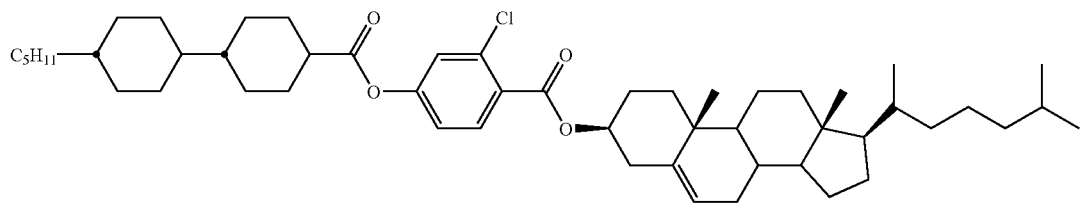
(3)
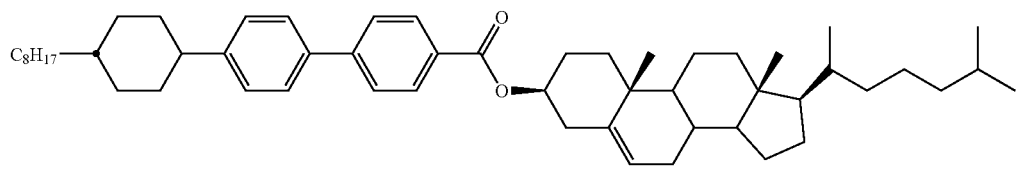
(4)
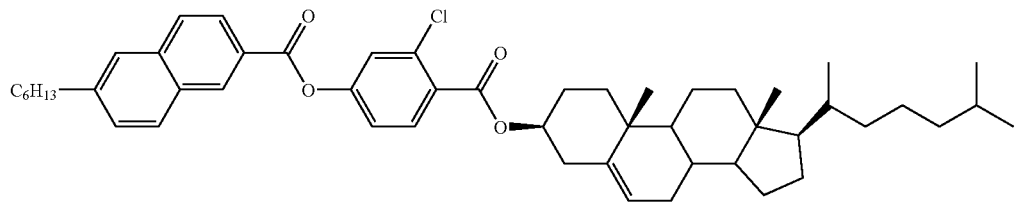
(5)
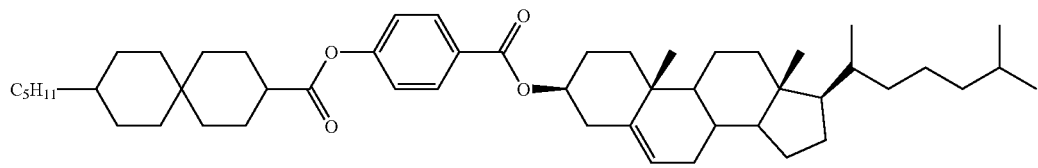
(6)
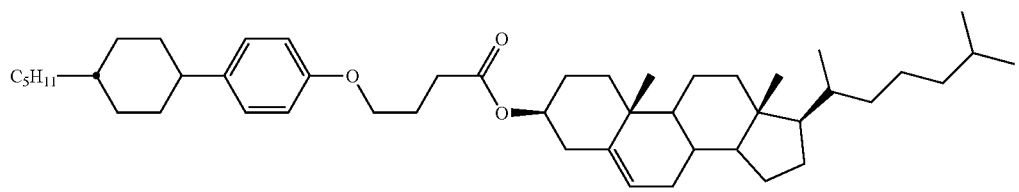
(7)
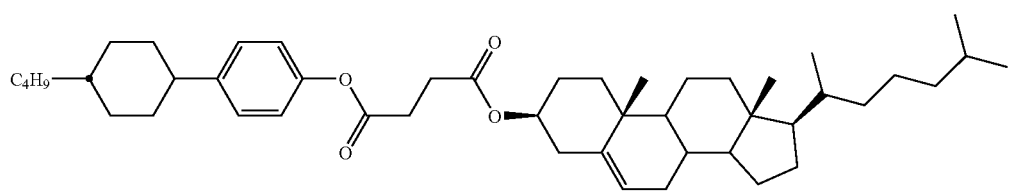
(8)
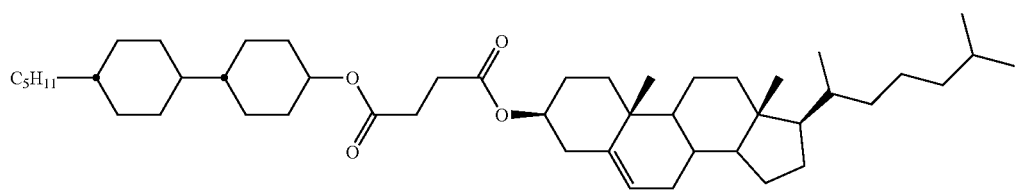
(9)

-continued
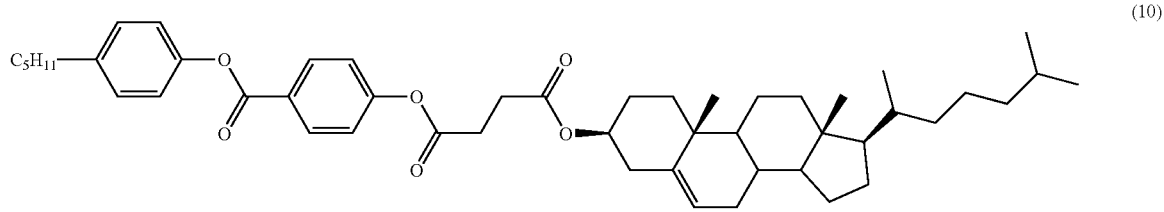
(10)
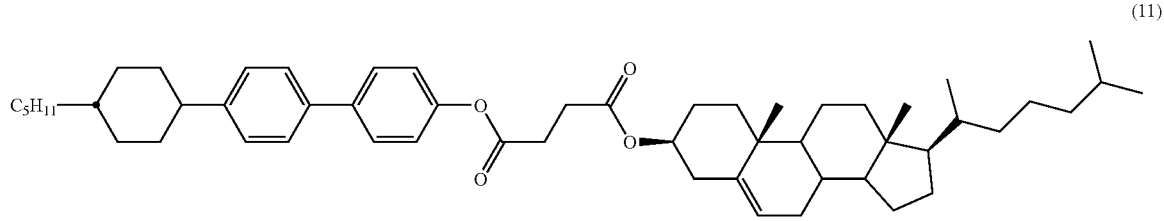
(11)
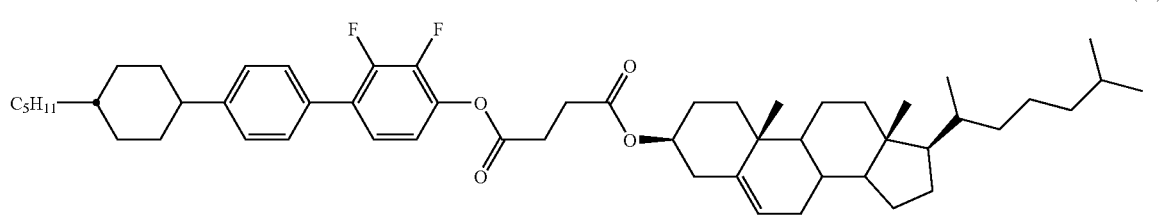
(12)
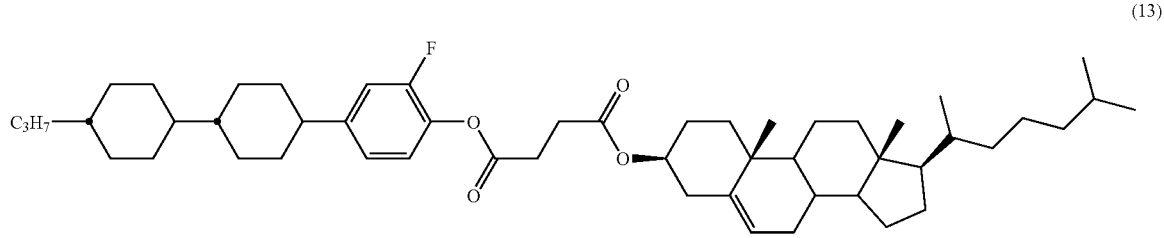
(13)
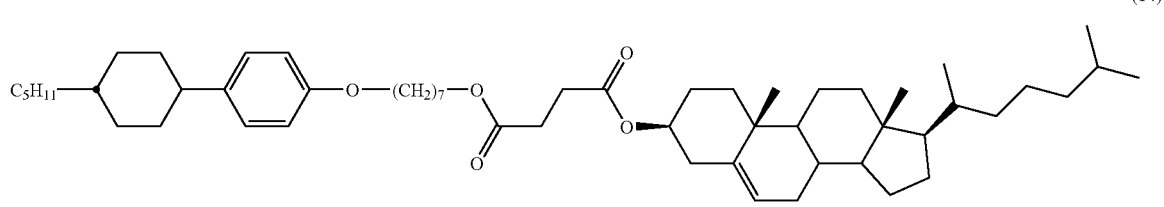
(14)
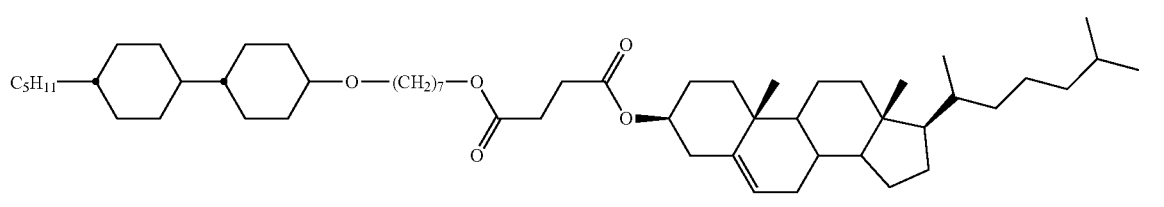
(15)
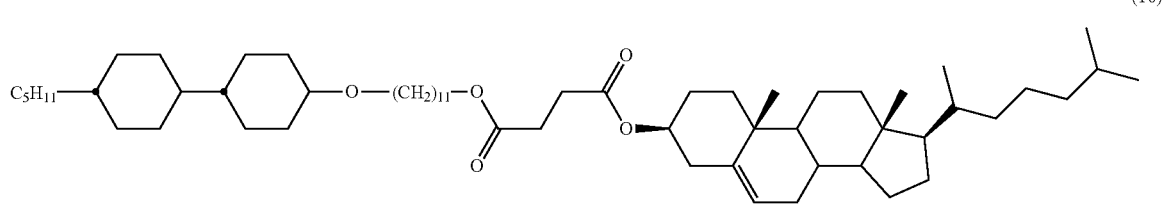
(16)

-continued
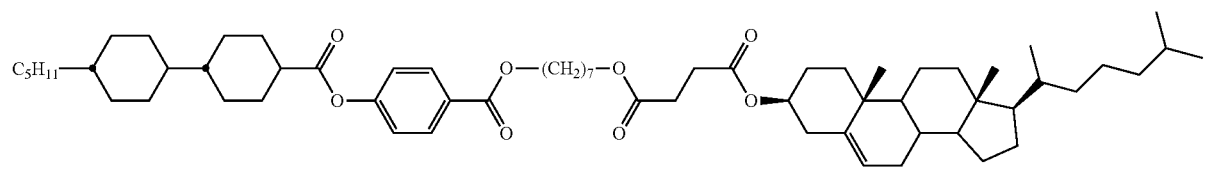
(17)
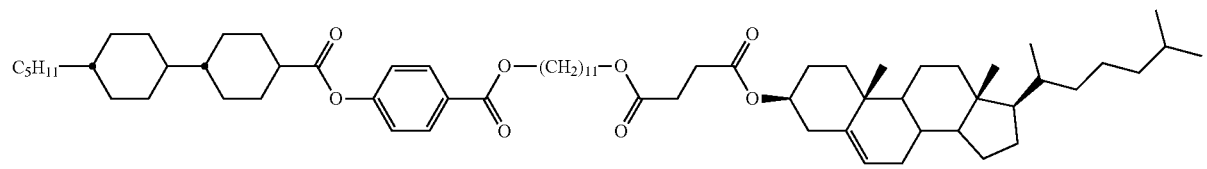
(18)
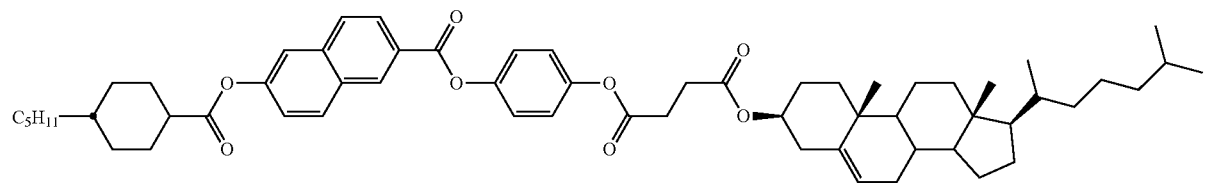
(19)
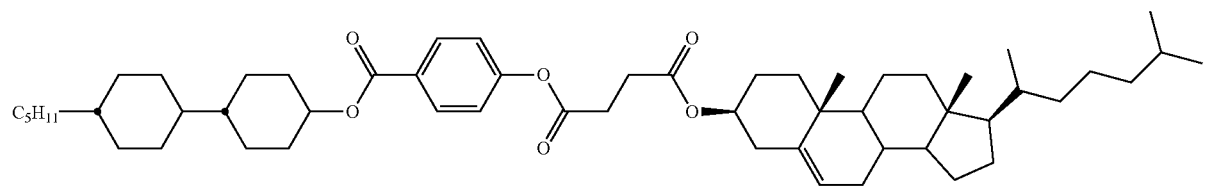
(20)
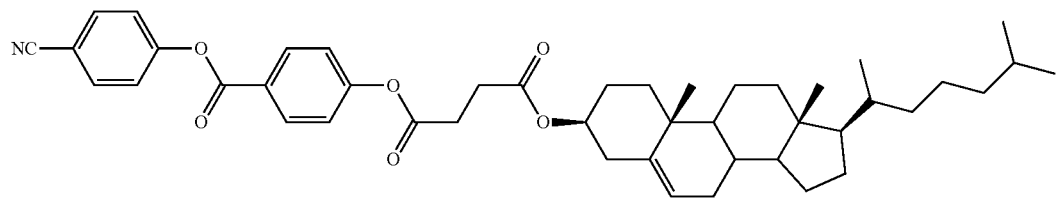
(21)
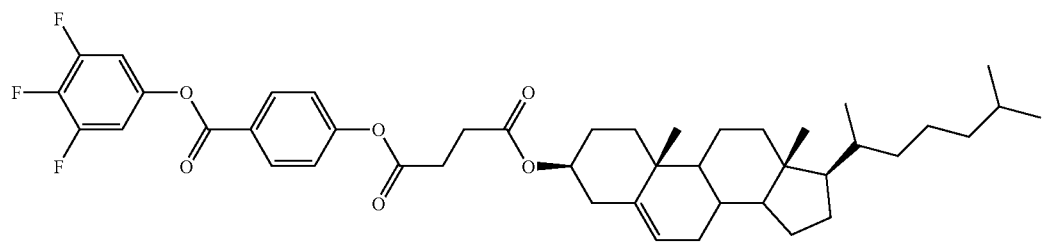
(22)
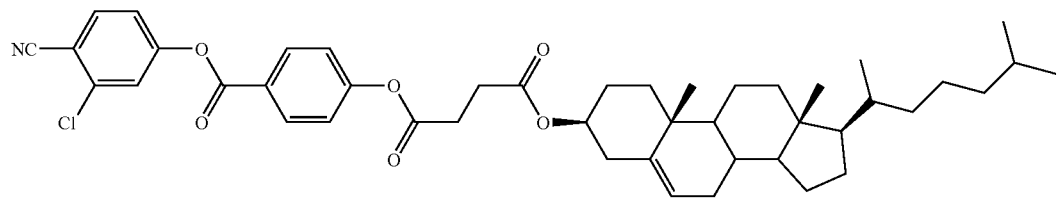
(23)

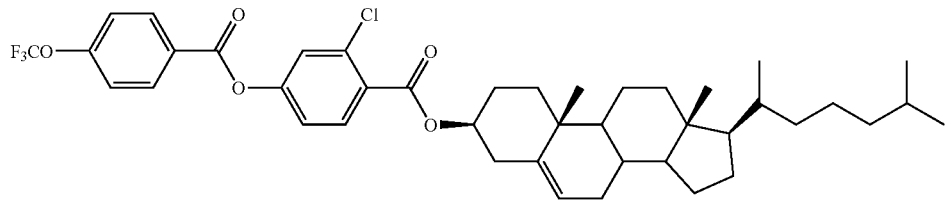

(24)

In the liquid crystal composition of the present invention, although there is no limitation regarding the contents of the nematic liquid crystal and the chiral dopant, a cell gap (d) of a liquid crystal cell that is used as the liquid crystal element of the present invention and a helical pitch (P) of the liquid crystal preferably satisfy the relationship of 0.1≦d/P≦3, more preferably satisfy the relationship of 0.25≦d/P≦1.5, particularly preferably satisfy the relationship of 0.4≦d/P≦2, and most preferably satisfy the relationship of 0.6≦d/P≦1.5. It should be noted that the "helical pitch" is defined as the distance at which the helical structure of the liquid crystal molecule rotates 360°.

Specifically, the chiral dopant is preferably added to the nematic liquid crystal so that the pitch length P becomes 0.01 µm to 100 µm, more preferably added so that it becomes 0.1 µm to 50 µm, and even more preferably added so that it becomes 1 µm to 20 µm.

Host Liquid Crystal

Next, the host liquid crystal used in the liquid crystal composition of the present invention will be explained.

The host liquid crystal used in the liquid crystal element of the present invention is not particularly limited as long as it can coexist with the dichroic dye. For example, a liquid crystal compound that exhibits a nematic phase or a smectic phase can be utilized.

Specific examples of the liquid crystal compounds include azomethine compounds, cyanobiphenyl compounds, cyanophenyl esters, fluorine-substituted phenyl esters, phenyl cyclohexanecarboxylate ester, fluorine-substituted phenyl cyclohexanecarboxylate esters, cyanophenylcyclohexane, fluorine-substituted phenylcyclohexanes, cyano-substituted phenylpyrimidines, fluorine-substituted phenylpyrimidines, alkoxy-substituted phenylpyrimidines, fluorine-substituted alkoxy-substituted phenylpyrimidines, phenyldioxane, tolan compounds, fluorine-substituted tolan compounds, alkenylcyclohexylbenzonitriles and the like. Also used favorably are the liquid crystal compounds described in the "Liquid Crystal Device Handbook" (Japan Society for the Promotion of Science 142nd Committee Ed., Nikkankogyo Shimbun, 1989), pp. 154 to 192 and pp. 715 to 722. Fluorine-substituted host liquid crystals suitable for TFT addressing may also be used.

Further, in order to raise display contrast, it is preferable that an absolute value of a refractive index anisotropy Δn of the host liquid crystal is 0.25 or less, it is more preferable that |Δn|≦0.15, it is even more preferable that |Δn|≦0.10, and it is particularly preferable that |Δn|≦0.08.

Further, as the host liquid crystal, a dual frequency driven liquid crystal may be applied.

The dual frequency driven liquid crystal refers to a liquid crystal which exhibits positive dielectric anisotropy in a case where the frequency of an electric field that is applied to the liquid crystal is in a low frequency range, and in which the dielectric anisotropy reverses to a negative sign in the case of a high frequency range.

Details are described in the "Liquid Crystal Device Handbook" (Japan Society for the Promotion of Science 142nd Committee, Ed., Nikkankogyo Shimbun, 1989), pp. 189-192. Specific examples thereof include the following dual frequency driven liquid crystal compositions available from Aldrich.

Dual Frequency Driven Liquid Crystal Composition 1

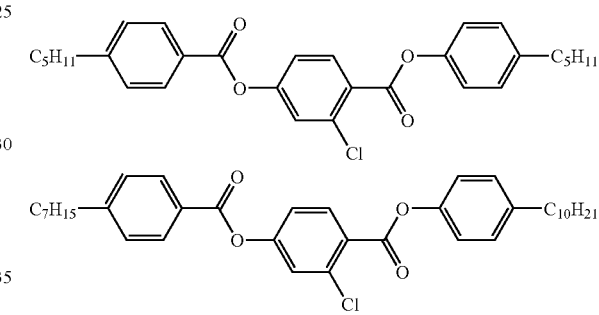

Other commercially available dual frequency driven liquid crystal materials include DF-02XX, DF-05XX, FX-1001, and FX-1002 (all trade names, manufactured by Chisso Corporation), MLC-2048 (trade name, manufactured by Merck) and the like.

Specific examples of the skeleton for the above liquid crystal compounds include azomethine compounds, cyanobiphenyl compounds, cyanophenyl esters, fluorine-substituted phenyl esters, phenyl cyclohexanecarboxylate ester, fluorine-substituted phenyl cyclohexanecarboxylate esters, cyanophenylcyclohexane, fluorine-substituted phenylcyclohexanes, cyano-substituted phenylpyrimidines, fluorine-substituted phenylpyrimidines, alkoxy-substituted phenylpyrimidines, fluorine-substituted alkoxy-substituted phenylpyrimidines, phenyldioxane, tolan compounds, fluorine-substituted tolan compounds, alkenylcyclohexylbenzonitriles and the like. When using a dual frequency driven liquid crystal composition, the light-controlling material of the present invention is driven by applying and switching between different high and low frequency voltages.

The dual frequency driven liquid crystal composition according to the invention may be a mixture of multiple crystal compositions. Further, the dual frequency driven liquid crystal composition may contain a liquid crystal compound in which the polarity of the dielectric anisotropy is not reversed between the low and high frequency ranges of the applied electric field.

The range of the electric field applied to the liquid crystal is preferably 0.1 Hz to 10 MHz, and more preferably 1 Hz to 1

MHz. A typical low frequency range is 0.1 Hz to 100 kHz, preferably 1 Hz to 10 kHz, and more preferably 10 Hz to 10 kHz. A typical high-frequency range is 100 Hz to 10 MHz, preferably 100 Hz to 1 MHz, and more preferably 1 kHz to 1 MHz.

In the present invention, since a chiral dopant having a rod-shaped liquid crystalline group represented by Formula (1) is used, it is preferable that the structure of the host liquid crystal resembles the structure of the rod-shaped liquid crystalline group represented by Formula (1) in view of being able to maintain a homeotropic orientation even in a short helical pitch length. However, it is clear that the chiral dopant according to the present invention achieves the effect of improving display contrast even with respect to a liquid crystal having a structure that is not similar thereto.

Accordingly, as described above, the host liquid crystal that is used in the present invention is not particularly limited as long as it can coexist with the dichroic dye.

From the standpoints of the refractive index anisotropy Δn, the dielectric anisotropy Δ∈, the liquid crystal order parameter, and the practical liquid crystal temperature range, liquid crystals such as ZLI-2806 and MLC-6609 (both trade names, manufactured by Merck & Co., Inc.) are preferable examples of the host liquid crystal.

A compound exhibiting no liquid crystallinity may be added to the liquid crystal composition according to the invention, in order to modify the physical properties of the host liquid crystal (such as the temperature range of the liquid crystalline phase) to a desired range. In addition, the liquid crystal composition according to the invention may contain various additives such as ultraviolet absorbent, antioxidant, and others.

Dichroic Dye

Hereinafter, the dichroic dye used in the liquid crystal composition of the present invention will be explained.

The dichroic dye is defined as a compound which is dissolved in a host liquid crystal and has a function of absorbing light. While the absorption maximum and the absorbing band of the dichroic dye are not particularly restricted, it is preferable that the dye has an absorption maximum in a yellow region (Y), a magenta region (M) or a cyan region (C).

The dichroic dye to be used for the liquid crystal compositions of the present invention may be used alone or may be used as a mixture of plurality of them. In a case of mixing a plurality of dyes, dyes having the same species of chromophoric group may be mixed, dichromatic dyes having chromophoric groups which are different from each other may be mixed, and a mixture of dichroic dyes having absorption maximums in Y, M and C is preferably used.

Well known dichroic dyes include, for example, those described in "Diachronic Dyes for Liquid Crystal Display", written by A. V. Ivashchenko, 1994, published from CRC Corp. A method of conducting full color display by mixing a yellow dye, a magenta dye, and a cyan dye is described in details in "Color Chemistry", (written by Sumio Tokida, 1982, published from Maruzen). The yellow region herein is a range of 430 to 490 nm, the magenta region is a range of 500 to 580 nm, and the cyan region is a range of 600 to 700 nm.

Next, the chromophoric group used in the dichroic dye of the present invention will be explained.

Any chromophoric group of the dichroic dye may be used, including, for example, azo dyes, anthraquinone dyes, perylene dyes, merocyanine dyes, azomethine dyes, phthaloperylene dyes, indigo dyes, azulene dyes, dioxadine dyes, polythiophene dyes, and phenoxadine dyes. Preferable are azo dyes, anthraquinone dies, phenoxazine dyes, and particularly preferable are anthraquinone dyes, and phenoxazone dyes phenoxazine-3-one).

The azo dyes may be any of monoazo dyes, bisazo dyes, trisazo dyes, tetrakisazo dyes, and pentakisazo dyes, and preferable are monoazo dyes, bisazo dyes, trisazo dyes and the like.

The cyclic structure contained in the azo dye may be heterocyclic rings (quinoline ring, pyridine ring, thiazole ring, benzothiazole ring, oxazole ring, benzooxazole ring, imidazole ring, benzoimidazole ring, pyrimidine ring, etc.) in addition to aromatic groups (benzene ring, naphthalene ring, etc.).

The substituent for the anthraquinone dye is preferably those containing an oxygen atom, sulfur atom, or nitrogen atom and preferable examples thereof include an alkoxy group, an aryloxy group, an alkylthio group, an arylthio group, an alkylamino group, and an arylamino group. The number of substitution of the substituent may be of any number and di-substitution, tri-substitution, or tetrakis-substitution is preferable, and di-substitution and tri-substitution are particularly preferable. The substitution of the substituent may be at any position and preferable structure is 1,4-di-substitution, 1,5-di-substitution, 1,4,5-tri-substitution, 1,2,4-tri-substitution, 1,2,5-tri-substitution, 1,2,4,5-tetra-substitution, and 1,2,5,6-tetra-substitution.

The substituent for the phenoxazone dye (phenoxazin-3-one) is preferably those containing an oxygen atom, sulfur atom, or a nitrogen atom and preferable examples thereof include an alkoxy group, an aryloxy group, an alkylthio group, an arylthio group, an alkylamino group, and an arylamino group.

The dichroic dye according to the present invention preferably has the substituent represented by the following Formula (6).

-(Het)$_j$-((B$^1$)$_p$-(Q$^1$)$_q$-(B$^2$)$_r$)$_n$—C$^1$     Formula (6)

In Formula (6), Het represents oxygen atom or sulfur atom, and particularly preferably sulfur atom.

In Formula (6), B$^1$ and B$^2$ each represents independently an arylene group, a hetero-arylene group, or a bivalent cycloaliphatic hydrocarbon group each of which may or may not have a substituent.

The arylene group represented by B$^1$ and B$^2$ is preferably an arylene group having 6 to 20 carbon atoms, more preferably 6 to 10 carbon atoms. Specific examples of preferable arylene group include, for example, phenylene group, naphthalene group, and anthracene group, particularly preferably a substituted phenylene group, and further preferably 1,4-phenylene group.

The heteroarylene group represented by B$^1$ and B$^2$ is preferably a heteroarylene group having 1 to 20 carbon atoms, and more preferably a heteroarylene group having 2 to 9 carbon atoms. Specific examples of preferable heteroarylene group include, for example, a group consisting of a pyridine ring, a quinoline ring, an isoquinoline ring, a pyrimidine ring, a pyrazine ring, a thiophene ring, a furan ring, an oxazole ring, a thiazole ring, an imidazole ring, a pyrazole ring, an oxadiazole ring, a thiadiazole ring, and a triazole ring, as well as a heteroarylene group obtained by eliminating hydrogen atoms each by one from two carbon atoms in a condensed ring formed by ring condensation thereof.

The bivalent cycloaliphatic hydrocarbon group represented by B$^1$ and B$^2$ is preferably a bivalent cycloaliphatic hydrocarbon group having, preferably 3 to 20 carbon atoms, and more preferably 4 to 10 carbon atoms. Specific examples of preferable bivalent cycloaliphatic hydrocarbon group include a cyclohexanediyl and cyclopentanediyl, more preferably cyclohexane-1,2-diyl, cyclohexane-1,3-diyl, cyclohexane-1,4-diyl, and cyclopentane-1,3-diyl, particularly preferably (E)-cyclohexane-1,4-diyl.

The bivalent arylene group, the bivalent heteroarylene group, and the bivalent cycloaliphatic hydrocarbon group represented by $B^1$ and $B^2$ may further have a substituent and the substituent includes the substituent group V described previously.

Among the substituent group V, preferable substituent for the bivalent arylene group, bivalent heteroarylene group, and bivalent cyclic hydrocarbon group represented by $B^1$ and $B^2$ are the above mentioned alkyl group, aryl group, alkoxy group, aryloxy group, halogen atom, amino group, substituted amino group, hydroxy group, alkylthio group, and arylthio group, and more preferably alkyl group, aryl group, and halogen atom.

$Q^1$ in Formula (6) represents a bivalent linking group, which is a inking group having an atomic group containing at least one atom selected from carbon atom, nitrogen atom, sulfur atom, and oxygen atom.

The bivalent linking group represented by $Q^1$ is a bivalent linking group having preferably 0 to 60 carbon atoms, more preferably 0 to 30 carbon atoms, and further preferably 0 to 20 carbon atoms.

Preferable examples of the bivalent linking group represented by $Q^1$ include an alkylene group, an alkenylene group, an alkynilene group, an amide group, an ether group, an ester group, a sulfonamide group, an ureido group, a sulfonyl group, a sulfinyl group, a thioether group, a carbonyl group, an —NR— group (in which R represents hydrogen atom, an alkyl group or an aryl group), an azo group, an azoxy group, a heterocyclic bivalent group, and a bivalent linking groups having one or two or more of them in combination.

The alkylene group represented by $Q^1$ is an alkylene group having preferably 1 to 20 carbon atoms, more preferably 1 to 10 carbon atoms, and preferable examples thereof include a methylene group, an ethylene group, a propylene group, a butylene group, a pentylene group, and a cyclohexyl-1,4-diyl group.

The alkenylene group represented by $Q^1$ is preferably an alkenylene group having preferably 2 to 20 carbon atoms, more preferably 2 to 10 carbon atoms, and preferable examples thereof include an ethenylene group.

The alkynylene group represented by $Q^1$ is an alkynylene group having, preferably 2 to 20 carbon atoms, more preferably 2 to 10 carbon atoms, and preferable examples thereof include an ethynylene group.

The alkyl group represented by R in the —NR— group is an alkyl group having preferably 1 to 20 carbon atom, more preferably 1 to 10 carbon atoms, and the aryl group represented by R is an aryl group having, preferably 6 to 14 carbon atoms, more preferably 6 to 10 carbon atoms.

The heterocyclic ring represented by $Q^1$ is a heterocyclic ring of, preferably 2 to 20 carbon atoms, more preferably 4 to 10 carbon atoms, and preferable examples thereof include a piperazine-1,4-diyl group.

The bivalent linking group represented by $Q^1$ is preferably an alkylene group, an alkenylene group, an alkynylene group, an ether group, a thioether group, an amido group, an ester group, a carbonyl group, and their combinations.

The bivalent linking group represented by $Q^1$ is particularly preferably an alkylene group, an alkynylene group, an ether group, an amido group, an ester group, and a carbonyl group.

$C^1$ in Formula (6) represents an alkyl group, a cycloalkyl group, an alkoxy group, an alkoxycarbonyl group, an acyl group, and an acyloxy group.

$C^1$ is preferably an alkyl group or a cycloalkyl group having 1 to 30 carbon atoms, preferably 1 to 12 carbon atoms, more preferably from 1 to 8 carbon atoms, an alkoxy group having 1 to 20 carbon atoms, preferably 1 to 10 carbon atoms, more preferably 1 to 8 carbon atoms, an acyloxy group having 1 to 20 carbon atoms, preferably 2 to 12 carbon atoms, more preferably 2 to 8 carbon atoms, an acyl group having 1 to 30 carbon atoms, preferably 1 to 12 carbon atoms, more preferably 1 to 8 carbon atoms, and an alkoxycarbonyl group having 2 to 20 carbon atoms, preferably 2 to 12 carbon atoms, more preferably 2 to 8 carbon atoms.

The alkyl group, cycloalkyl group, alkoxy group, alkoxycarbonyl group, acyl group and acyloxy group represented by $C^1$ may have or may not have a substituent, and the substituent includes, for example, the substituent group V described above.

Examples of the substituent for the alkyl group represented by $C^1$ include, among the substituent group V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, and an aryloxycarbonyl group.

Examples of the substituent for the cycloalkyl group represented by $C^1$ include, among the substituent group V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, an aryloxycarbonyl group, and an alkyl group.

Examples of the substituent for the alkoxy group represented by $C^1$ include, among the substituent group V, a halogen atom (particularly, fluorine atom), a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, and an aryloxycarbonyl group.

Examples of the substituent for the alkoxycarbonyl group represented by $C^1$ include, among the substituent group V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, and an aryloxycarbonyl group.

Examples of the substituent for the acyl group represented by $C^1$ include, among the substituent group V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group and an aryloxycarbonyl group.

Examples of the substituent for the acyloxy group represented by $C^1$ include, among the substituent group V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, and an aryloxycarbonyl group.

Specific examples of the alkyl group and the cycloalkyl group represented by $C^1$ include, for example, methyl, ethyl, propyl, butyl, t-butyl, i-butyl, s-butyl, pentyl, t-pentyl, hexyl, heptyl, octyl, cyclohexyl, 4-methylcyclohexyl, 4-ethylcyclohexyl, 4-propylcyclohexyl, 4-butylcyclohexyl, 4-pentylcyclohexyl, hydroxymethyl, trifluoromethyl and benzyl.

Specific examples of the alkoxy group represented by $C^1$ include, for example, a methoxy group, an ethoxy group, a 2-methoxyethoxy group, or a 2-phenylethoxy group.

Specific examples of the acyloxy group represented by $C^1$ include, for example, an acetyloxy group, and a benzoyloxy group.

Specific examples of the acyl group represented by $C^1$ include, for example, acetyl, formyl, pivaloyl, 2-chloroacetyl, stearoyl, benzoyl, and p-n-octyloxyphenylcarbonyl.

Specific examples of the alkoxycarbonyl group represented by $C^1$ include, for example, methoxycarbonyl, ethoxycarbonyl, and 2-benzyloxycarbonyl.

$C^1$ represents particularly preferably an alkyl group or an alkoxy group, and more preferably ethyl, propyl, butyl, pentyl, hexyl, or trifluoromethoxy.

j represents 0 or 1, and preferably 0.

p, q and r each independently represents an integer of from 0 to 5, and n represents an integer of from 1 to 3. The total number of the groups represented by $B^1$ and $B^2$, that is, $(p+r) \times n$ is an integer of from 3 to 10, more preferably an integer of from 3 to 5. When p, q, and r are 2 or more, the two or more of $B^1$, $Q^1$ and $B^2$ may respectively be the same as or different from each other. When n is 2 or more, the two or more of $((B^1)_p\text{-}(Q^1)_q\text{-}(B^2)_r)$ may be the same as or different from each other.

Preferable examples of combinations of p, q, r, and n are described below.

(i) p=3, q=0, r=0, n=1
(ii) p=4, q=0, r=0, n=1
(iii) p=5, q=0, r=0, n=1
(iv) p=2, q=0, r=1, n=1
(v) p=2, q=1, r=1, n=1
(vi) p=1, q=1, r=2, n=1
(vii) p=3, q=1, r=1, n=1
(viii) p=2, q=0, r=2, n=1
(ix) p=1, q=1, r=1, n=2
(x) p=2, q=1, r=1, n=2

Particularly preferable examples of the combinations are: (i) p=3, q=0, r=0, n=1, (iv) p=2, q=0, r=1, n=1, or (v) p=2, q=1, r=1, n=1.

Further, the —$((B^1)_p\text{-}(Q^1)_q\text{-}(B^2)_r)_n$—$C^1$ preferably contains a structure showing liquid crystallinity. While the liquid crystal referred to herein may be in any phase, it is preferably nematic liquid crystal, smectic liquid crystal, discotic liquid crystal, and particularly preferably nematic crystal or smectic liquid crystal.

Specific examples of the —$((B^1)_p\text{-}(Q^1)_q\text{-}(B^2)_r)_n$—$C^1$ are shown below while the present invention is no way limited to the examples (in the following chemical formulae, the wave line represents a connection position).

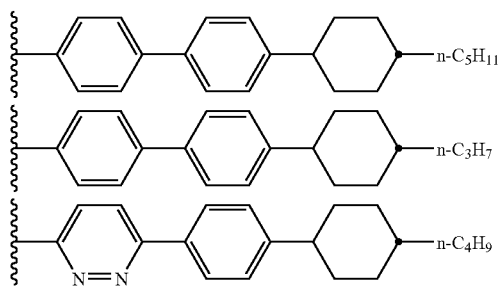

The dichroic dye used in the present invention has preferably one or more, more preferably 1 to 8, further preferably 1 to 4, and particularly preferably 1 to 2 substituents represented by —$((B^1)_p\text{-}(Q^1)_q\text{-}(B^2)_r)_n$—$C^1$.

A preferable structure of the substituent represented by Formula (6) includes combinations described below.

[1] A structure in which Het represents sulfur atom, $B^1$ represents an aryl group or a heteroaryl group, $B^2$ represents cyclohexane-1,4-diyl group, $C^1$ represents an alkyl group, and j=1, p=2, q=0, r=1, and n=1.

[2] A structure in which Het represents sulfur atom, $B^1$ represents an aryl group or a heteroaryl group, $B^2$ represents cyclohexane-1,4-diyl group, $C^1$ represents an alkyl group, and j=1, p=1, q=0, r=2 and n=1.

Particularly preferable structures are:

[1] a structure represented by the following Formula (a-1), in which Het represents sulfur atom, $B^1$ represents 1,4-phenylene group, $B^2$ represents trans-cyclohexyl group, $C^1$ represents an alkyl group (preferably, methyl, ethyl, propyl, butyl, pentyl, or hexyl), and j=1, p=2, q=0, r=1 and n=1, and

[2] a structure represented by the following Formula (a-2), in which Het represents a sulfur atom, $B^1$ represents 1,4-phenylene group, $B^2$ represents trans-cyclohexane-1,4-diyl, $C^1$ represents an alkyl group (preferably, methyl, ethyl, propyl, butyl, pentyl, or hexyl), and j=1, p=1, q=0, r=2 and n=1.

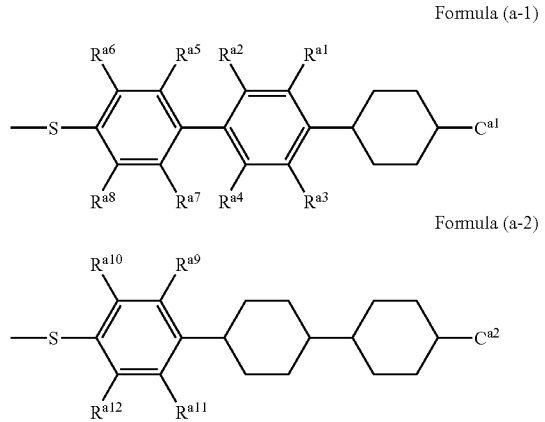

Formula (a-1)

Formula (a-2)

In Formulae (a-1) and (a-2), $R^{a1}$ to $R^{a12}$ each independently represents a hydrogen atom or a substituent. The substituent includes, for example, a substituent selected from the substituent group V. $R^{a1}$ to $R^{a12}$ each independently represents preferably hydrogen atom, a halogen atom (particularly, fluorine atom), an alkyl group, an aryl group, and an alkoxy group. Among the alkyl group, aryl group, and alkoxy group represented by $R^{a1}$ to $R^{a12}$, preferable are those identical with the alkyl group, aryl group, and alkoxy group described for the substituent group V.

In formulae (a-1) and (a-2), $C^{a1}$ and $C^{a2}$ each independently represents an alkyl group, and an alkyl group having preferably 1 to 20 carbon atoms, more preferably 1 to 10 carbon atoms, and particularly preferably methyl, ethyl, propyl, butyl, pentyl, or hexyl.

The azo dye may be any of monoazo dye, bisazo dye, trisazo dye, tetrakisazo dye, or pentakisazo dye, and preferably a monoazo dye, bisazo dye and trisazo dye.

A ring structure contained in the azo dye includes, in addition to aromatic groups (benzene ring, naphthalene ring, etc.), hetero rings (a quinoline ring, a pyridine ring, a thiazole ring, a benzothiazole ring, an oxazole ring, a benzoxazole ring, an imidazole ring, a benzoimidazole ring, a pyrimidine ring, etc.).

Preferable examples of the substituent for the anthraquinone dye include those containing an oxygen atom, sulfur atom or nitrogen atom, and specific examples thereof include an alkoxy group, an aryloxy group, an alkylthio group, an arylthio group, an alkylamino group, and an arylamino group.

While the number of substitution for the substituent may be of any number, and di-substitution, tri-substitution, and tetra-substitution are preferable, and di-substitution, tri-substitution are particularly preferable. The substitution of the substituent may be at any position adopted, but preferable are 1,4-di-substitution, 1,5-di-substitution, 1,4,5-tri-substitution, 1,2,4-tri-substitution, 1,2,5-tri-substitution, 1,2,4,5-tetra-substitution, and 1,2,5,6-tetra-substitution structure.

The anthraquinone dye is more preferably a compound represented by the following Formula (7).

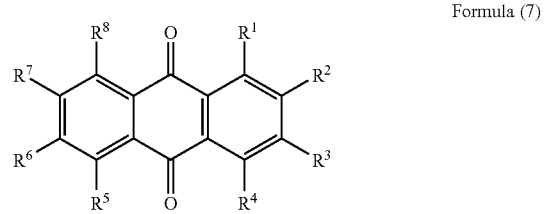

Formula (7)

In Formula (7), at least one of $R^1$, $R^2$, $R^3$, $R^4$, $R^5$, $R^6$, $R^7$ and $R^8$ represents -$(Het)_j$-$((B^1)_p$-$(Q^1)_q$-$(B^2)_r)_n$—$C^1$, and others each independently represents a hydrogen atom or a substituent.

In -$(Het)_j$-$((B^1)_p$-$(Q^1)_q$-$(B^2)_r)_n$—$C^1$, Het represents an oxygen atom or a sulfur atom, $B^1$ and $B^2$ each independently represents an arylene group, a heteroarylene group, or a bivalent alicyclic hydrocarbon group, $Q^1$ represents a bivalent linking group, $C^1$ represents an alkyl group, a cycloalkyl group, an alkoxy group, an alkoxycarbonyl group, an acyl group, or an acyloxy group, j represents 0 or 1, p, q and r each independently represents an integer of from 0 to 5, and n represents an integer of from 1 to 3. The total number of the groups represented by $B^1$ and $B^2$, that is, (p+r)×n, is an integer of from 3 to 10, and preferably an integer of from 3 to 5; when p is 2 or more, the two or more of $B^1$ may be the same as or different from each other; when q is 2 or more, the two or more of $Q^1$ may be the same as or different from each other; when r is 2 or more, the two or more of $B^2$ may be the same as or different from each other; and when n is 2 or more, the two or more of $((B^1)_p$-$(Q^1)_q$-$(B^2)_r)$ may be the same as or different from each other.

The preferable ranges for Het, $B^1$, $B^2$, $Q^1$, $C^1$, j, p, q, r and n herein are respectively the same as the preferable ranges for Het, $B^1$, $B^2$, $Q^1$, $C^1$, j, p, q, r and n as in Formula (6).

Examples of the substituent in Formula (7) is the substituent group V, and preferable examples thereof include a halogen atom, a mercapto group, a hydroxy group, a carbamoyl group, a sulfamoyl group, a nitro group, an alkoxy group, an aryloxy group, an acyloxy group, an acylamino group, an amino group, an alkylthio group, an arylthio group, a heteroarylthio group, an alkoxycarbonyl group, an aryloxycarbonyl group, an alkyl group, an aryl group, and a heteroaryl group, and more preferably a halogen atom, a hydroxy group, a nitro group, an alkoxy group, an aryloxy group, an acyloxy group, an amino group, an alkylthio group, an arylthio group, a heteroarylthio group, an alkoxycarbonyl group, an aryloxycarbonyl group, an alkyl group, an aryl group, and a heteroaryl group.

Further, it is more preferable, at least one of $R^1$, $R^4$, $R^5$ and $R^8$ represents -$(Het)_j$-$((B^1)_p$-$(Q^1)_q$-$(B^2)_r)_n$—$C^1$ in Formula (7).

The substituent for the phenoxazone dye (phenoxazine-3-one) is preferably those containing oxygen atom, sulfur atom, or nitrogen atom, and preferable examples include an alkoxy group, an aryloxy group, an alkylthio group, an arylthio group, an alkylamino group, and an arylamino group.

The phenoxazone dye is more preferably a compound represented by the following Formula (8).

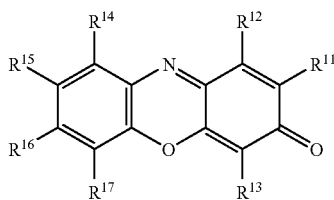

Formula (8)

In Formula (8), at least one or more of $R^{11}$, $R^{12}$, $R^{13}$, $R^{14}$, $R^{15}$, $R^{16}$, and $R^{17}$ represent -(Het)$_j$-((B$^1$)$_p$-(Q$^1$)$_q$-(B$^2$)$_r$)$_n$—C$^1$, and others represent a hydrogen atom or a substituent, respectively.

In the -(Het)$_j$-((B$^1$)$_p$-(Q$^1$)$_q$-(B$^2$)$_r$)$_n$—C$^1$, Het represents oxygen atom or sulfur atom, B$^1$ and B$^2$ each independently represents an arylene group, a heteroarylene group or a bivalent alicyclic hydrocarbon group, Q$^1$ represents a bivalent linking group, C$^1$ represents an alkyl group, a cycloalkyl group, an alkoxy group, an alkoxycarbonyl group, an acyl group, or an acyloxy group, j represents 0 or 1, p, q, and r each independently represents an integer of from 0 to 5, n represents an integer of from 1 to 3. The total number of the groups represented by B$^1$ and B$^2$, that is, (p+r)×n, is an integer of from 3 to 10, and preferably an integer of from 3 to 5, when p is 2 or more, the two or more of B$^1$ may be the same as or different from each other; when q is 2 or more, the two or more of Q$^1$ may be the same as or different from each other; when r is 2 or more, the two or more of B$^2$ may be the same as or different from each other; and when n is 2 or more, the two or more of ((B$^1$)$_p$-(Q$^1$)$_q$-(B$^2$)$_r$) may be the same as or different from each other.

The preferable ranges for Het, B$^1$, B$^2$, Q$^1$, C$^1$, j, p, q, r and n in this case are respectively identical with the preferable ranges for Het, B$^1$, B$^2$, Q$^1$, C$^1$, j, p, q, r, and n as in Formula (6).

Examples of the substituent in Formula (8) is the substituent group V, and preferable examples thereof include an amino group, a halogen atom, a hydroxy group, an cyano group, an carbamoyl group, a sulfamoyl group, an alkoxy group, an aryloxy group, an acyloxy group, an acylamino group, an ureido group, an imido group, an alkylthio group, an arylthio group, a heteroarylthio group, an alkoxycarbonyl group, an aryloxycarbonyl group, an alkyl group, an aryl group, a heteroaryl group, and more preferably an amino group, a halogen atom, a hydroxy group, a carbamoyl group, an acyloxy group, an acylamino group, an imido group, an alkylthio group, an arylthio group, a heteroarylthio group, an alkoxycarbonyl group, an aryloxycarbonyl group, an alkyl group, and an aryl group.

Further preferably, in Formula (8), at least one of $R^{11}$, $R^{14}$, and $R^{16}$ represents -(Het)$_j$-((B$^1$)$_p$-(Q$^1$)$_q$-(B$^2$)$_r$)$_n$—C$^1$.

Specific examples of the dichroic dyes of anthraquinone dye and/or phenoxazone dye usable in the present invention are shown below, but the present invention is no way limited at all by the specific examples below.

No. 1-1

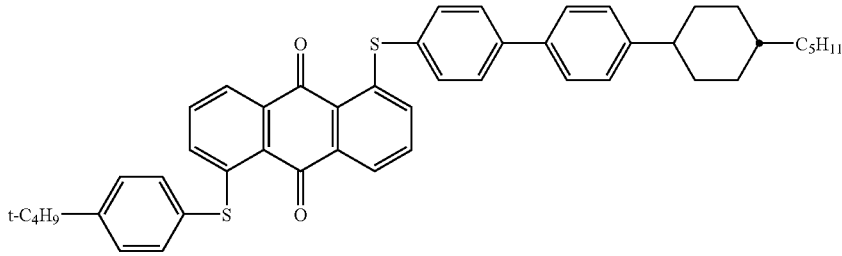

No. 1-2

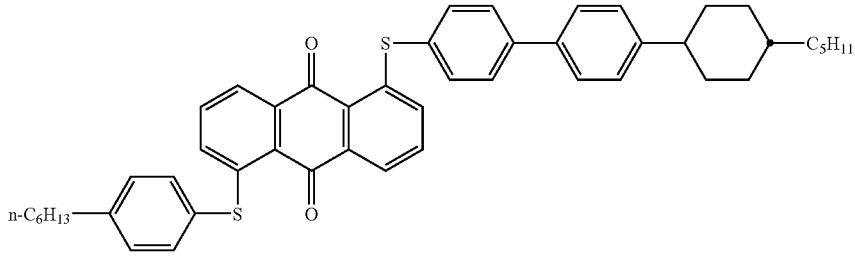

No. 1-3

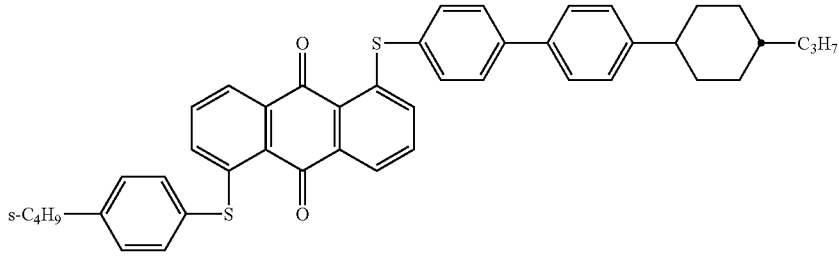

-continued
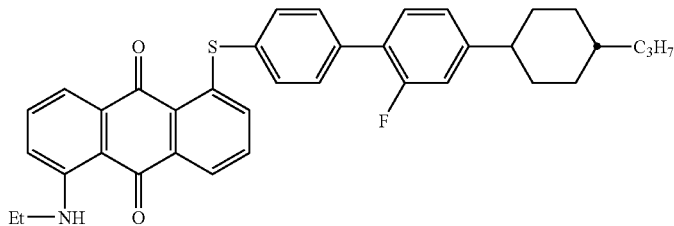
No. 1-4
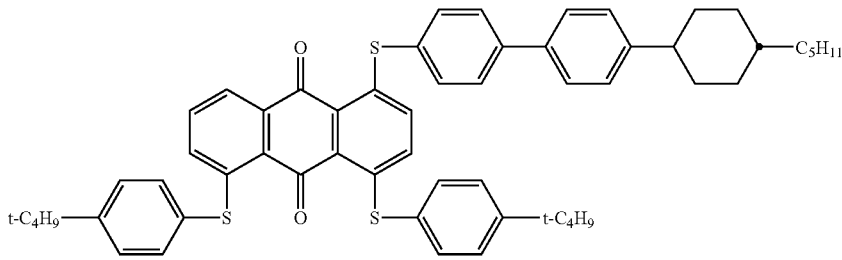
No. 1-5
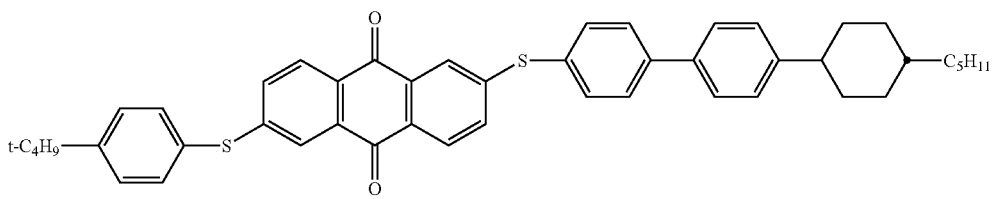
No. 1-6
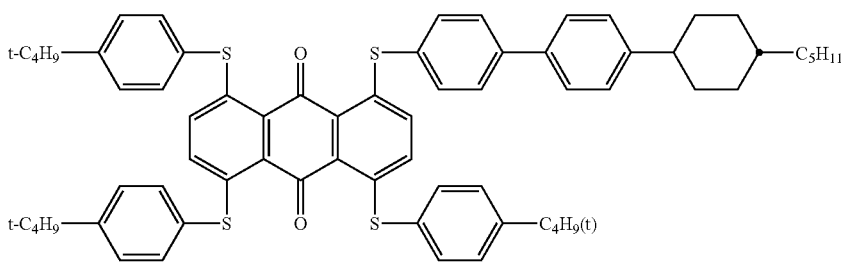
No. 1-7
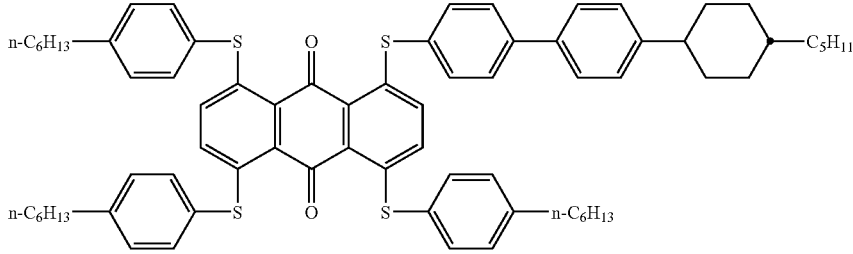
No. 1-8
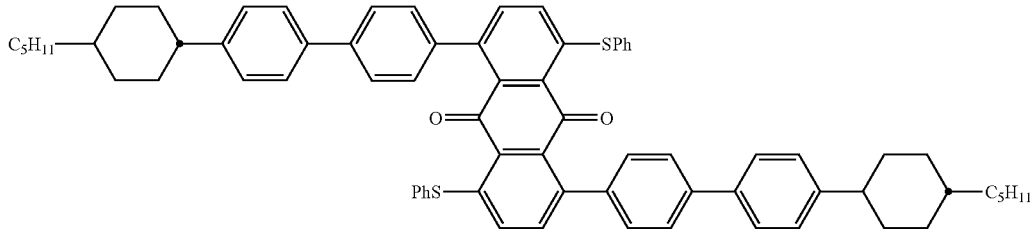
No. 1-9

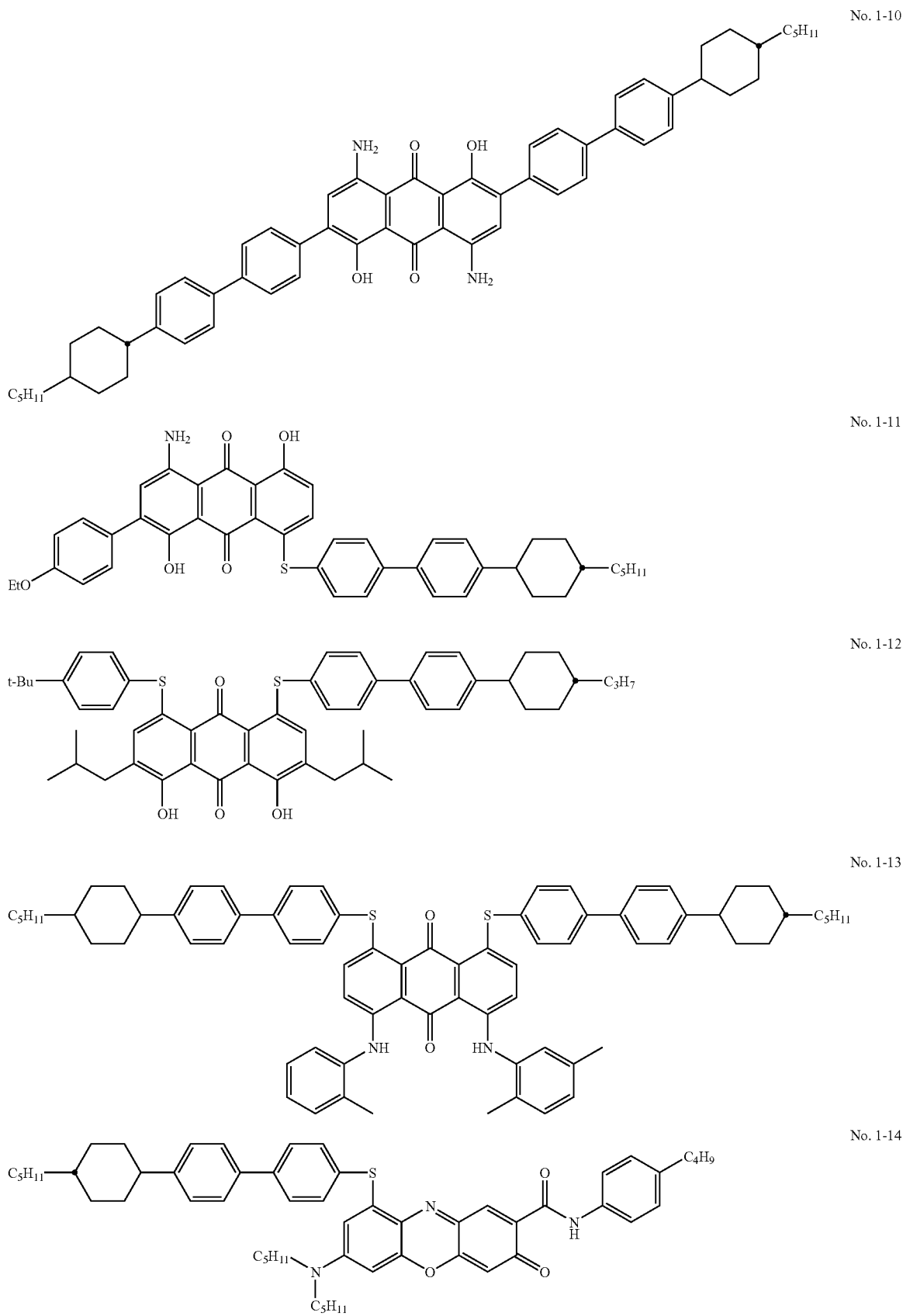

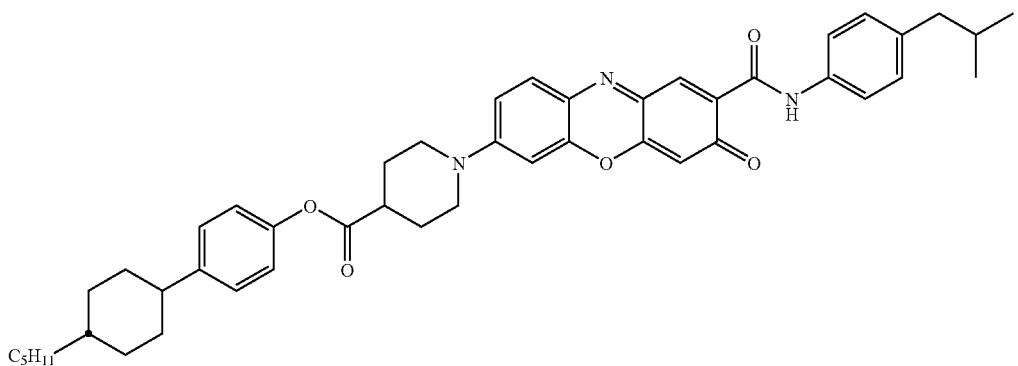
No. 1-15
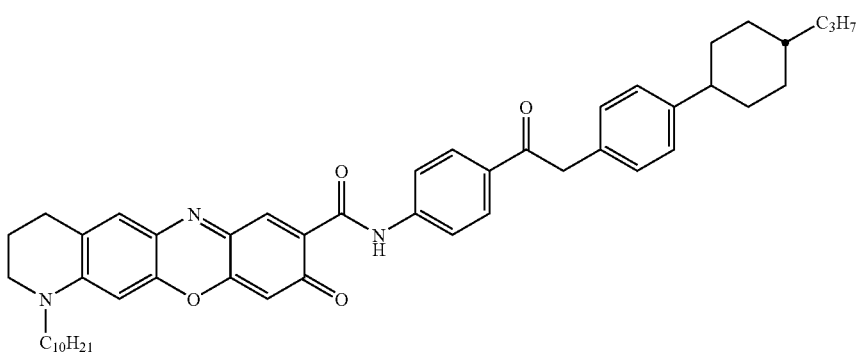
No. 1-16
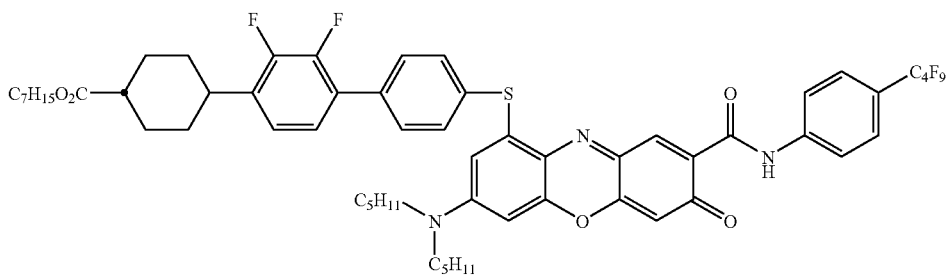
No. 1-17
Specific examples of the azo dichroic dyes usable in the present invention are shown below but the present invention is not restricted to the following specific examples.
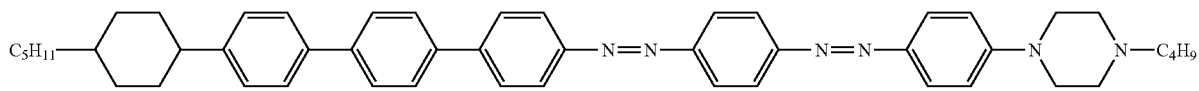
No. 2-1
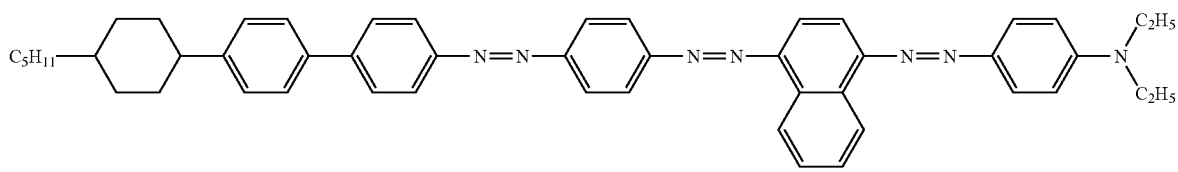
No. 2-2

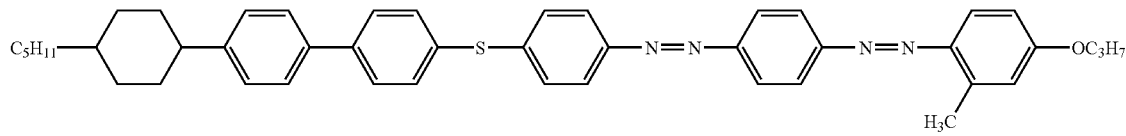

No. 2-3

Specific examples of the dioxadine dichroic dyes and merocyanine dichroic dyes usable in the present invention are shown below but the present invention is not restricted to the following specific examples.

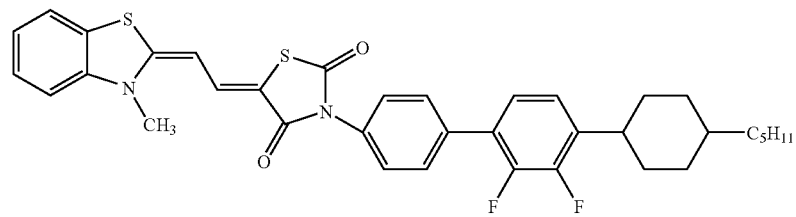

No.3-1

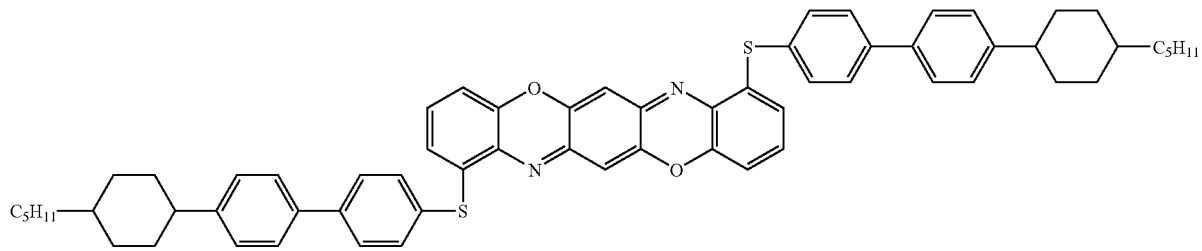

No.3-2

The dichroic dye having the substituent represented by Formula (6) can be synthesized by combining known methods. They can be synthesized, for example, in accordance with the method described in JP-A No. 2003-192664.

The ratio of the dichroic dye to the host liquid crystal in the liquid crystal composition according to the invention is not particularly limited, as the absorption coefficient varies according to the dye, but is preferably 0.1 to 15 wt % and particularly preferably 0.2 to 8 wt %.

The dichroic dye can be dissolved to the host liquid crystal by utilizing mechanical stirring, heating, supersonic waves, or combination thereof. In addition, for the preparation of the liquid crystal composition of the present invention, known methods can be adopted.

Liquid Crystal Element

The liquid crystal element according to the invention includes a pair of electrodes, at least one of which is a transparent electrode, and a liquid crystal layer, containing the above-described liquid crystal composition, held between the pair of electrodes.

As the electrode substrate used for the liquid crystal element of the present invention, a glass or plastic substrate is usually used, the plastic substrate being preferable. The material for the plastic substrate used in the present invention includes, for example, acryl resin, polycarbonate resin, and epoxy resin, specifically, triacetyl cellulose (TAC), polyethylene terephthalate (PET), polyethylene naphthalate (PEN), syndiotactic polystyrene (SPC), polyphenylene sulfide (PPS), polycarbonate (PC), polyarylate (PAr), polysulfone (PSF), polyester sulfone (PES), polyether imide (PEI), cyclo-polyolefin, and polyimide (PI), preferably polyethylene terephthalate (PET).

While the thickness of the plastic substrate is not particularly limited, it is preferably from 30 μm to 700 μm, more preferably from 40 μm to 200 μm, and further preferably 50 μm to 150 μm. In any of the cases, haze of the plastic substrate is preferably 3% or less, more preferably 2% or less, and further preferably 1% or less, and the total transmittance of the plastic substrate is preferably 70% or more, more preferably 80% or more, and further preferably 90% or more.

In the plastic substrate, improvers for resin such as plasticizers, dyes and pigments, antistatics, UV absorbents, antioxidants, inorganic fine particles, peeling promoters, leveling agents, and lubricants may be added optionally within a range not deteriorating the effect of the present invention.

The plastic substrate may be either light permeable or light impermeable. In a case of using light impermeable support as the support, a white support having light reflectivity can be used. The white support includes plastic substrate with addition of inorganic pigments such as titanium oxide or zinc oxide. In a case where the support constitutes a display surface, it is necessary that the support has permeability to at least a light in a visible region.

The substrate is described specifically, for example, in "Liquid Crystal Device Handbook" edited by Japan Society for the Promotion of Science, the 142th Committee, published from Nikkan Kogyo Shinbunsha, 1989, pp 218 to 231.

An electrode layer, preferably a transparent electrode layer, is formed on the surface of at least one of the pair of substrates. For the electrode layer, indium oxide, indium thin oxide (ITO), tin oxide, etc. are used. For the transparent electrode, those described, for example, in "Liquid Crystal Device Handbook" edited by Japan Society for the Promotion of Science, the 142th Committee, published from Nikkan Kogyo Shinbunsha, 1989, pp 232 to 239 are used. The transparent electrode can be formed by a sputtering method, sol-gel method or printing method.

With an aim of orienting the liquid crystal in the liquid crystal element of the present invention, a layer subjected to an orientation treatment may be formed to the surface where the liquid crystal and substrate are in contact with each other. The orientation treatment includes, for example, a method of orientation by coating a quaternary ammonium salt, a method of orientation by coating polyimide and applying a rubbing treatment, a method of orientation by vapor depositing $SiO_x$ in the oblique direction, and further, a method of orientation by photo-irradiation utilizing photo-isomerization. For the oriented film, those described, for example, in "Liquid Crystal Device Handbook" edited by Japan Society for the Promotion of Science, the 142th Committee, published from Nikkan Kogyo Shinbunsha, 1989, pp 240 to 256 are used.

The oriented film can achieve the effects of the present invention whether it is vertically-oriented or horizontally-oriented. Further, in a non-absorption (colorless) mode (normally white) at a time when a voltage is not applied, it is preferable to provide a vertically-oriented film and to combine this with a liquid crystal having a negative dielectric anisotropy $\Delta\in$.

In the liquid crystal element of the present invention, a space of 1 to 50 μm may be formed between a pair of substrates to each other by way of a spacer, and the liquid crystal can be injected into the space. For the spacer, those described, for example, in "Liquid Crystal Device Handbook" edited by Japan Society for the Promotion of Science, the 142th Committee, published from Nikkan Kogyo Shinbunsha, 1989, pp 257 to 262 are used. The liquid crystal composition of the present invention can be disposed between the substrates by coating or printing on the substrate.

The liquid crystal element of the present invention may further have a white reflection plate, anti-reflection film, brightness improving film, etc.

The liquid crystal element of the present invention can be addressed by a passive matrix addressing system or an active matrix addressing system using, for example, a thin film transistor (TFT). The addressing system is described specifically, for example, in "Liquid Crystal Device Handbook" (edited by Japan Society for the Promotion of Science, the 142th Committee, published from Nikkan Kogyo Shinbunsha, 1989), pp 387 to 460, which can be utilized as the addressing method for the liquid crystal element of the present invention.

The liquid crystal display using the phase transition type GH mode liquid crystal element of the present invention may be one in which another system is combined therewith. For example, examples thereof include (1) homogeneous orientation, (2) homeotropic orientation, (3) focal conic orientation and (4) homeotropic orientation as White-Taylor types (phase transition), (5) a combination with super twisted nematic (STN) and (6) a combination with a ferroelectric liquid crystal (FLC), which are disclosed as guest-host systems described in the "Liquid Crystal Device Handbook" edited by the Japan Society for the Promotion of Science 142nd Committee, Nikkankogyo Shimbun, Ltd. (1989), p. 309, and (1) a Heilmeier type GH mode, (2) a ¼ wavelength plate type GH mode, (3) a two-layer type GH mode and (4) a polymer dispersion liquid crystal (PDLC) type GH mode, which are described in "Reflective Color LCD General Technologies", compiled under the supervision of Tatsuo Uchida, CMC Publishing Co., Ltd. (1999), Chapter 2-1 (GH Mode Reflective Color LCDs), pp. 15-16.

In the liquid crystal layer according to the invention, multiple dichroic dyes may be mixed in one liquid crystal composition. The color of the liquid crystal composition is also not limited. For example, when a black liquid crystal composition is prepared by mixing multiple dichroic dyes, it can be used as a liquid crystal element for a display turning black or white by application of voltage.

It is also possible to prepare a liquid crystal element for color display, by preparing liquid crystal compositions colored respectively in red, green and blue and placing the three kinds of compositions on a substrate side by side.

On the other hand, the liquid crystal layer according to the invention may have a laminated structure held between a pair of electrodes, as described, for example, in JP-A No. 10-90, 715. As described on the displaying method of the liquid crystal element according to the invention, it is preferable to add dichroic dyes in the subtractive or complementary relationship to the layer in the lamination direction.

Examples thereof include a three-layered laminate configuration of layers of liquid crystal compositions colored in yellow, magenta and cyan; a two-layered laminate configuration of a layer of liquid crystal compositions colored in yellow, magenta and cyan and a layer of liquid crystal compositions colored in complementary blue, green and red colors placed side by side; a two-layered laminate configuration of a layer of a liquid crystal composition colored in black and a layer of liquid crystal compositions colored in red, blue and green placed side by side; and the like.

Reflective Display Material and Light-Controlling Material

The liquid crystal composition of the present invention may be used for any application as long as it is an application using a cholesteric liquid crystal (for example, displays and sensors utilizing selective reflection, lasers using pseudo-first-order photonic crystal, and the like).

For example, the liquid crystal element containing the liquid crystal composition of the present invention can be preferably utilized for reflective display materials, light controlling, security, vehicle-mounted applications, interior, advertisements, and information display panels in order to be able to provide high display performance and light-controlling performance.

In the case where the liquid crystal element of the present invention is used as a reflective display material, at least one of the pair of electrode substrates may be a transparent electrode. A liquid crystal layer including the liquid crystal composition is provided between the pair of electrodes, and a reflection plate is further provided. In the reflective display material, light that is incident from the side of an observer is reflected by the reflection plate, and the observer observes this reflected light.

In addition to this, known members such as a retardation plate may be appropriately provided in the reflective display material.

In the case where the liquid crystal element of the present invention is used as a light-controlling material, both of the pair of electrode substrates are transparent. In the light-controlling material, light that is incident from a side that is opposite from the observer is observed from the opposite side via the light-controlling material.

Since the light-controlling material is sometimes used while exposed to the outdoors, it is preferable to provide a barrier film, an ultraviolet absorption layer, an antireflection layer, a hard coat layer, a contamination prevention layer, an ultraviolet absorption layer or the like at the light-controlling material.

EXAMPLES

Examples are shown below for describing the present invention in more details, while the present invention is not restricted thereto.

Example 1

Preparation of Chiral Dopant (1)

A dichloromethane solution (5 ml) containing dicyclocarbodiimide (0.65 g) was added in drops to a dichloromethane solution (10 ml) containing 4'-butylbicyclohexyl-4-carboxylic acid (0.76 g), cholesterol (1 g) (manufactured by Wako Pure Chemical Industries) and N,N-dimethylaminopyridine (0.19 g), and the mixture was stirred while being heated to reflux for one hour. The reaction solution was added to chloroform/1N hydrochloric acid water; and the organic layer was washed with aqueous 1 N hydrochloric acid, dried with magnesium sulfate, and concentrated under reduced pressure. The concentrated residue was purified by silica gel column chromatography (developing solvent: ethyl acetate/hexane: 1/10), and the crude crystal obtained was recrystallized from isopropyl alcohol, to give chiral dopant (1) (1.2 g). The compound was identified by elemental analysis and NMR and MASS spectra. The appearance was of a white solid.

$^1$H-NMR (CDCl$_3$)

δ: 0.67 (3H, s), 0.75-2.06 (0.66H, m), 2.15 (1H, ddt), 2.28 (2H, d), 4.6 (1H, m), 5.38 (1H, m)

Preparation of Chiral Dopant (3)

A chiral dopant (3) was prepared according to the following scheme.

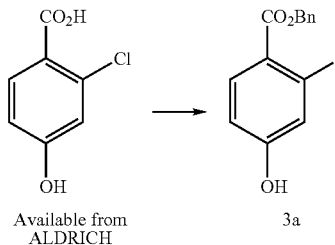

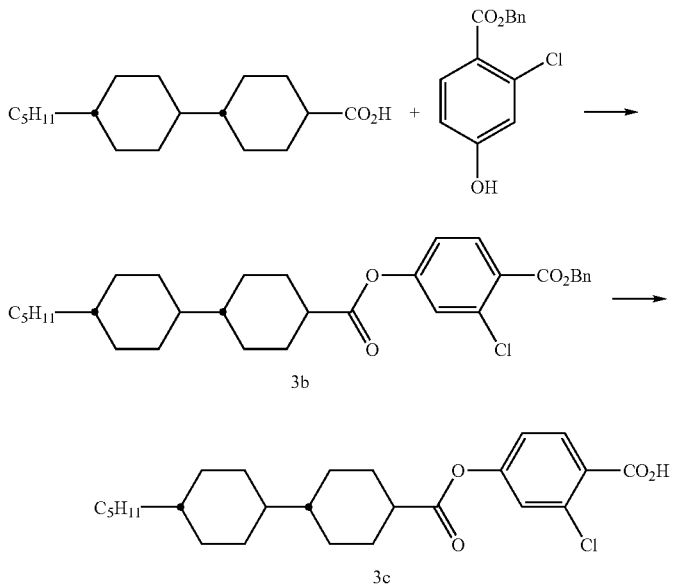

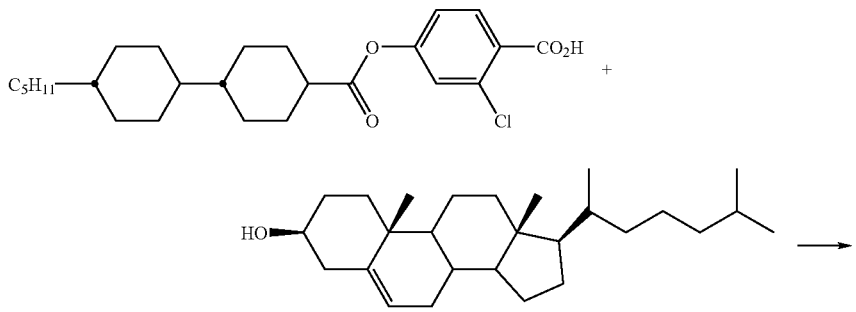

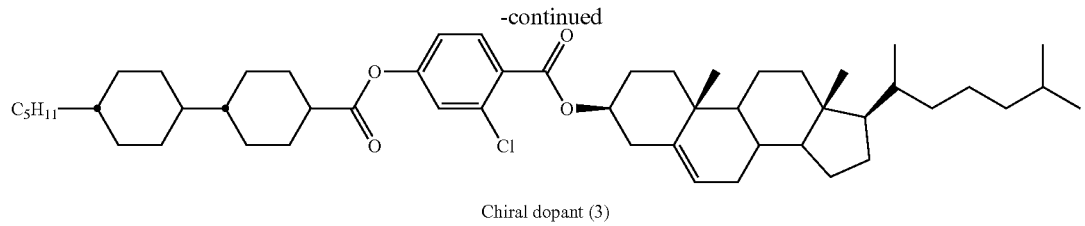

Chiral dopant (3)

Preparation of Compound 3a

Benzyl bromide (39.6 g) was added in drops to an acetonitrile solution (400 ml) containing 2-chloro-4-hydroxybenzoic acid (20 g) (manufactured by ALDRICH) and CsF-Celite (58.4 g) (prepared according to Synthetic Communications, 28 (11), pp. 2021-2026 (1998)), and the mixture was stirred while being heated to reflux for 3 hours. The reaction solution was concentrated under reduced pressure; ethyl acetate (400 ml) was added; and the mixture was filtered. The filtrate was condensed under reduced pressure; and the concentrated residue was purified by silica gel column chromatography (developing solvent: ethyl acetate/hexane: 1/2); and the crude crystal obtained was recrystallized from ethyl acetate/hexane, to give compound 3a (26.7 g).

Preparation of Compound 3b

A methylene chloride solution (50 ml) containing dicyclocarbodiimide (9.4 g) was added in drops to methylene chloride solution (100 ml) containing compound 3a (10 g), 4'-pentylbicyclohexl-4-carboxylic acid (10.7 g) and dimethylaminopyridine (0.9 g), and the mixture was stirred while being heated to reflux for one hour. The reaction solution was filtered and added to ethyl acetate/1N hydrochloric acid water; and the organic layer was washed with aqueous 1 N hydrochloric acid, dried with magnesium sulfate, and concentrated under reduced pressure. Purification of the concentrated residue by silica gel column chromatography (developing solvent: ethyl acetate/hexane: 1/5) gave compound 3b (16.8 g).

Preparation of Compound 3c

10% Pd/C (2.0 g) was added to an isopropyl alcohol (120 ml)/THF (130 ml) mixed solution of compound 3b (16.7 g), and the mixture was stirred for three hours under conditions of normal-pressure hydrogen addition. The reaction solution was subjected to sellite filtration, and condensed under reduced pressure. A condensation residue was recrystallized from ethanol, to give compound 3c (12.6 g).

Preparation of Chiral Dopant (3)

Thionyl chloride (0.25 ml) was added to an ethyl acetate solution (10 ml) containing compound 3c (1.2 g), and the mixture was stirred at 85° C. for 2 hours. The mixture was added in drops to pyridine solution (10 ml) containing cholesterol (1 g) in an ice bath, and the mixture was stirred for 2 hours. The reaction solution was poured into ethyl acetate/1N hydrochloric acid water; and the organic layer was washed with aqueous 1 N hydrochloric acid and then with aqueous saturated sodium chloride, dried with magnesium sulfate, and concentrated under reduced pressure. The concentrated residue was purified by silica gel column chromatography (developing solvent: chloroform/hexane: 1/1), and the crude crystal obtained was recrystallized from ethanol, to give a chiral dopant (3) (1.1 g). The compound was identified by elemental analysis and NMR and MASS spectra. The appearance was of a white solid.

$^1$H-NMR (CDCl$_3$)

δ: 0.65 (3H, s), 0.80-1.65 (53H, m), 1.65-2.09 (13H, m), 2.14 (2H, d), 2.40-2.52 (3H, m), 4.86 (1H, m), 5.42 (1H, m), 7.04 (1H, d), 7.20 (1H, s), 7.84 (1H, d)

Chiral dopants (2), (5), and (7) to (18) can be prepared in a similar manner to the above described preparation method. The compounds were identified by elemental analysis and NMR and MASS spectra. The appearance was of a white solid.

Chiral Dopant (2)
$^1$H-NMR (CDCl$_3$)
δ: 0.69 (3H, s), 0.83-2.08 (58H, m), 2.44 (2H, d), 2.52 (1H, dtt), 4.85 (1H, m), 5.41 (1, m), 7.25 (2H, d), 7.95 (2H, d).

Chiral Dopant (5)
$^1$H-NMR (CDCl$_3$)
δ: 0.70 (3H, s), 0.81-2.10 (49H, m), 2.49 (2H, d), 2.82 (2H, t), 4.90 (1H, m), 5.44 (1H, m), 7.27 (1H, d), 7.43 (2H, sd), 7.96 (1H, s), 7.87 (1H, d), 7.91 (1H, d), 7.94 (1H, d), 8.12 (1H, d), 8.73 (1H, s)

Chiral Dopant (7)
$^1$H-NMR (CDCl$_3$)
δ: 0.68 (3H, s), 0.82-1.65 (48H, m), 1.76-1.90 (8H, m), 1.90-2.12 (4H, m), 2.31 (2H, d), 2.40 (1H, ddt), 2.47 (2H, t), 3.96 (2H, t), 4.63 (1H, m), 5.36 (1H, m), 6.80 (2H, d), 7.10 (2H, d)

Chiral Dopant (8)
$^1$H-NMR (CDCl$_3$)
δ: 0.68 (3H, s), 0.83-1.70 (46H, m), 1.77-2.05 (10H, m), 2.35 (2H, d), 2.45 (1H, ddt), 2.47 (2H, t), 2.85 (2H, t), 4.64 (1H, m), 5.38 (1H, m), 6.99 (2H, d), 7.19 (2H, d)

Chiral Dopant (9)
$^1$H-NMR (CDCl$_3$)
δ: 0.65 (3H, s), 0.74-2.06 (68H, m), 2.30 (2H, d), 2.57 (4H, bs), 2.47 (2H, t), 4.55-4.72 (2H, m), 5.37 (1, m)

Chiral Dopant (10)
$^1$H-NMR (CDCl$_3$)
δ: 0.66 (3H, s), 0.80-1.70 (42H, m), 1.85-2.06 (5H, m), 2.33 (2H, d), 2.62 (2H, t), 2.47 (2H, t), 2.90 (2H, t), 4.68 (1H, m), 5.38 (1H, m), 7.10 (2H, d), 7.23 (4H, dd), 8.22 (2H, d)

Chiral Dopant (11)
$^1$H-NMR (CDCl$_3$)
δ: 0.66 (3H, s), 0.81-1.70 (48H, m), 1.75-2.05 (10H, m), 2.33 (2H, d), 2.50 (1H, ddt), 2.72 (2H, t), 2.89 (2H, t), 4.66 (1H, m), 5.36 (1H, m), 7.14 (2H, d), 7.28 (2H, d), 7.48 (2H, d), 7.55 (2H, d)

Chiral Dopant (12)
$^1$H-NMR (CDCl$_3$)
δ: 0.66 (3H, s), 0.81-1.70 (48H, m), 1.75-2.06 (10H, m), 2.33 (2H, d), 2.51 (1H, ddt), 2.75 (2H, t), 2.95 (2H, t), 4.67 (1H, m), 5.38 (1H, m), 6.98 (1H, ddt), 7.16 (2H, d), 7.48 (1H, ddt), 7.29 (2H, d), 7.43 (2H, d)

Chiral Dopant (13)
¹H-NMR (CDCl₃)
δ: 0.68 (3H, s), 0.76-2.06 (64H, m), 2.32 (2H, d), 2.42 (1H, ddt), 2.71 (2H, t), 2.90 (2H, t), 4.67 (1H, m), 5.38 (1H, m), 6.91-7.08 (3H, m)

Chiral Dopant (14)
¹H-NMR (CDCl₃)
δ: 0.67 (3H, s), 0.84-1.68 (56H, m), 1.71-1.60 (10H, m), 1.90-2.05 (2H, m), 2.30 (2H, t), 22.32 (2H, d), 2.40 (1H, ddt), 2.59 (4H, m), 3.91 (2H, t), 4.07 (2H, t), 4.62 (1H, m), 5.36 (1H, m), 6.81 (2H, d), 7.10 (2H, d)

Chiral Dopant (15)
¹H-NMR (CDCl₃)
δ: 0.69 (3H, s), 0.75-1.91 (74H, m), 1.92-2.05 (4H, m), 2.19 (1H, ddt), 2.33 (2H, d), 2.61 (4H, bs), 4.04 (2H, t), 4.09 (2H, t), 4.62 (1H, m), 5.38 (1H, m)

Chiral Dopant (16)
¹H-NMR (CDCl₃)
δ: 0.68 (3H, s), 0.76-2.06 (86H, m), 2.19 (1H, ddd), 2.33 (2H, d), 2.63 (4H, s), 4.04 (2H, t), 4.08 (2H, t), 4.63 (1H, m), 5.38 (1H, m)

Chiral Dopant (17)
¹H-NMR (CDCl₃)
δ: 0.68 (3H, s), 0.82-1.91 (74H, m), 1.95 (2H, ddd), 2.16 (2H, d), 2.32 (2H, d), 2.48 (1H, ddd), 2.61 (4H, s), 4.09 (2H, t), 4.32 (2H, t), 4.63 (1H, m), 5.38 (1H, m), 7.14 (2H, d), 8.06 (2H, d)

Chiral Dopant (18)
¹H-NMR (CDCl₃)
δ: 0.70 (3H, s), 0.81-1.68 (71H, m), 1.68-1.91 (11H, m), 1.99 (2H, ddd), 2.16 (2H, d), 2.32 (2H, d), 2.48 (1H, ddd), 2.61 (4H, s), 4.07 (2H, t), 4.31 (2H, t), 4.62 (1H, m), 5.39 (1H, m), 7.13 (2H, d), 8.06 (2H, d)

The chiral dopant of the present invention (2 mg) was mixed with a host liquid crystal (98 mg) (trade name: ZLI-2806, manufactured by Merck & Co., Inc.), heated on a hot plate at 160° C. for 2 hours, cooled to room temperature and left overnight, to give a chiral nematic liquid crystal composition. The obtained liquid crystal composition was injected into a wedge-shaped liquid crystal cell (with a gap of 11.1 mm, manufactured by EHC Corporation), and by conducting observation with a polarization microscope, a pitch length was measured, and an HTP (helical twisting power) value was calculated. Further, the HTP value represents a twisting power (rotation ability) of the chiral dopant with respect to the host liquid crystal, which is calculated according to the following equation.

$$HTP = 1/(P \times C)$$

(P: pitch length; C: content of chiral dopant)

TABLE 1

| Chiral Dopant of the Present Invention | HTP Value |
|---|---|
| 1 | 2.75 |
| 2 | 4.34 |
| 3 | 1.94 |
| 4 | 1.86 |
| 5 | 2.44 |
| 6 | 3.05 |
| 7 | 2.91 |
| 8 | 2.58 |
| 9 | 2.08 |
| 10 | 2.58 |
| 11 | 2.08 |
| 12 | 1.81 |
| 13 | 2.96 |
| 14 | 3.15 |
| 15 | 3.63 |
| 16 | 3.50 |

TABLE 1-continued

| Chiral Dopant of the Present Invention | HTP Value |
|---|---|
| 17 | 3.33 |
| 18 | 3.33 |

Based on the calculated HTP value, the chiral dopant of the present invention was mixed with the host liquid crystal ZLI-2806 (trade name, manufactured by Merck & Co., Inc.) so that a pitch length was 10 to 11 μm, heated on a hot plate at 160° C. for 2 hours, cooled to room temperature and left overnight, to give chiral nematic liquid crystal compositions 1 to 10.

By way of comparison, commercially available chiral dopants R-1011 (trade name, manufactured by Merck & Co., Inc.) and CN (trade name, manufactured by ADEKA Corporation) were used to produce liquid crystal compositions 11 and 12 in the same manner.

Transition temperatures ($T_{iso}$) of the liquid crystal compositions were measured by placing the obtained liquid crystal compositions 1 to 12 on a glass plate and observing them under a polarization microscope while heating with a hot stage (manufactured by TOYO Corporation). It should be noted that the pitch lengths of the liquid crystal compositions were obtained by conducting measurement according to the same method as in Example 1.

TABLE 2

| Liquid Crystal Composition | Chiral Dopant | Transition Temperature $T_{iso}$ (° C.) | Pitch Length (μm) | Remark |
|---|---|---|---|---|
| 1 | 1 | 108.1 | 10.78 | Present Invention |
| 2 | 2 | 104.6 | 10.69 | Present Invention |
| 3 | 3 | 112.7 | 10.81 | Present Invention |
| 4 | 5 | 110.1 | 10.75 | Present Invention |
| 5 | 7 | 104.1 | 10.80 | Present Invention |
| 6 | 8 | 104.0 | 10.71 | Present Invention |
| 7 | 9 | 105.2 | 10.80 | Present Invention |
| 8 | 10 | 104.3 | 10.53 | Present Invention |
| 9 | 11 | 109.1 | 11.02 | Present Invention |
| 10 | 12 | 109.0 | 10.68 | Present Invention |
| 11 | R-1011 | 99.2 | 10.27 | Comparative Example |
| 12 | CN | 100.3 | 10.85 | Comparative Example |

As is apparent from Table 2, the transition temperature of the liquid crystal composition was increased by adding the chiral dopant of the present invention.

Example 2

In a similar manner as in Example 1, the chiral dopant of the present invention was mixed with the fluorine nematic liquid crystal MLC-6609 (trade name, manufactured by Merck & Co., Inc.) so that the pitch length was 10 to 11 μm, heated on a hot plate at 160° C. for 2 hours, cooled to room temperature and left overnight, to give chiral nematic liquid crystal composition 13.

By way of comparison, commercially available chiral dopants R-1011 (trade name, manufactured by Merck & Co., Inc.) and CN (trade name, manufactured by ADEKA Corporation) were used to produce liquid crystal compositions 11 and 12 in the same manner Transition temperatures ($T_{iso}$) of the liquid crystal compositions were measured by placing the obtained liquid crystal compositions 13 and 14 on a glass plate and observing them under a polarization microscope while heating with a hot stage (manufactured by TOYO Corporation). It should be noted that the pitch lengths of the liquid crystal compositions were obtained by conducting measurement according to the same method as in Example 4.

TABLE 3

| Liquid Crystal Composition | Chiral Dopant | Transition Temperature $T_{iso}$ (° C.) | Pitch Length (μm) | Remark |
|---|---|---|---|---|
| 13 | 8 | 104 | 16.1 | Present Invention |
| 14 | CN | 98.7 | 15.8 | Comparative Example |

As is apparent from Table 3, the chiral dopant of the present invention can also increase the transition temperature of a fluorine nematic liquid crystal composition.

Example 3

Liquid crystal compositions having different pitch lengths were produced by changing the amount of the chiral dopant of the present invention that was added to the host liquid crystal ZLI-2806 (trade name, manufactured by Merck & Co., Inc.). The obtained liquid crystal compositions were injected at room temperature into a liquid crystal evaluation cell (vertical orientation film; trade name: SE-1211, manufactured by Nissan Chemical Industries, Ltd.; cell gap: 15 μm; glass plate of 1.1 mm; provided with an epoxy resin seal) and left overnight. By observation of the state of orientation of the liquid crystal compositions under a polarization microscope, a threshold helical pitch length P at which a homeotropic orientation can be maintained was measured, and d/P was obtained (d represents a cell gap).

By way of comparison, commercially available chiral dopants R-811, R-1011 (trade name, manufactured by Merck & Co., Inc.), CNL-617L and CN (trade name, manufactured by ADEKA Corporation) were used to calculate d/P in the same manner.

TABLE 4

| Chiral Dopant | d/P | Remark |
|---|---|---|
| 1 | 0.962 | Present Invention |
| 2 | 0.955 | Present Invention |
| 3 | 0.968 | Present Invention |
| 5 | 0.958 | Present Invention |
| 7 | 0.932 | Present Invention |
| 8 | 0.974 | Present Invention |
| 9 | 0.955 | Present Invention |
| 10 | 0.958 | Present Invention |
| 11 | 0.993 | Present Invention |
| 12 | 0.98 | Present Invention |
| 13 | 0.968 | Present Invention |
| 14 | 0.962 | Present Invention |
| 15 | 0.938 | Present Invention |
| 16 | 0.943 | Present Invention |
| 17 | 0.943 | Present Invention |
| 18 | 0.929 | Present Invention |
| R-811 | 0.912 | Comparative Example |
| R-1011 | 0.893 | Comparative Example |
| CNL-617L | 0.909 | Comparative Example |
| CN | 0.915 | Comparative Example |

As is apparent from Table 4, chiral dopants of the present invention had a larger value for d/P, and the threshold helical pitch length P at which a homeotropic orientation can be maintained were shortened.

Example 4

By producing chiral nematic liquid crystal compositions in which the pitch length is equivalent, driving liquid crystal elements produced from the liquid crystal compositions in which a dichroic dye has been dissolved in a liquid crystal evaluation cell, and measuring the display contrast ratios of the liquid crystal elements, it can be confirmed that the order parameter of the liquid crystal composition is raised by adding the chiral dopant of the present invention to a host liquid crystal.

Preparation of Guest-Host Liquid Crystal Composition

The chiral dopant of the present invention was added to the host liquid crystal ZLI-2806 (trade name, manufactured by Merck & Co., Inc.) so that a pitch length became 9.2 μm, heated on a hot plate at 160° C. for 2 hours, cooled to room temperature and left overnight, to give a chiral nematic liquid crystal composition. A dichroic dye (1-14) was mixed in the obtained chiral nematic liquid crystal composition (with a dye content of 1.0 weight % to 1.2 weight %) so that a transmission rate at the time of non-application of voltage became 60%, heated on a hot plate at 160° C. for 2 hours, cooled to room temperature and left overnight, to give a guest-host liquid crystal composition.

Production of Guest-Host Liquid Crystal Element

The guest-host liquid crystal composition described above was injected into a liquid crystal evaluation cell (provided with an ITO transparent electrode; vertical orientation film; trade name: SE-1211, manufactured by Nissan Chemical Industries, Ltd.; cell gap: 8 μm; glass plate of 1.1 mm; provided with an epoxy resin seal), to give a liquid crystal element.

By way of comparison, commercially available chiral dopants R-811, R-1011 (trade name, manufactured by Merck & Co., Inc.), CNL-617L and CN (trade name, manufactured by ADEKA Corporation) were used to produce a liquid crystal element in the same manner.

Evaluation of Contrast Ratio

The contrast ratio (transmission rate at the time of non-application of voltage/transmission rate at the time of application of voltage) of the produced liquid crystal element was measured using a spectrophotometer (trade name: UV-2400, manufactured by Shimadzu Corporation). A voltage of 100 Hz and 20 Vp-p was applied to the liquid crystal element.

TABLE 5

| Chiral Dopant | Dichroic Dye | Pitch Length (μm) | Contrast Ratio | Remark |
|---|---|---|---|---|
| 1 | 1-14 | 9.2 | 7.1 | Present Invention |
| 2 | 1-14 | 9.2 | 6.3 | Present Invention |
| 3 | 1-14 | 9.2 | 7.9 | Present Invention |
| 5 | 1-14 | 9.2 | 8.3 | Present Invention |
| 7 | 1-14 | 9.2 | 6.2 | Present Invention |
| 8 | 1-14 | 9.2 | 6.2 | Present Invention |
| 9 | 1-14 | 9.2 | 6.5 | Present Invention |
| 10 | 1-14 | 9.2 | 6.2 | Present Invention |
| 11 | 1-14 | 9.2 | 7.5 | Present Invention |
| 12 | 1-14 | 9.2 | 7.5 | Present Invention |
| 13 | 1-14 | 9.2 | 7.2 | Present Invention |
| R-811 | 1-14 | 9.2 | 5.7 | Comparative Example |
| R-1011 | 1-14 | 9.2 | 5.6 | Comparative Example |
| CNL-617L | 1-14 | 9.2 | 5.6 | Comparative Example |
| CN | 1-14 | 9.2 | 5.7 | Comparative Example |

As is apparent from Table 5, it was found that the display contrast ratio of the liquid crystal element of the present invention becomes high. From this, it was confirmed that, due to using the chiral dopant of the present invention, the order parameter of the liquid crystal composition becomes high.

Example 5

Preparation of Guest-Host Liquid Crystal Composition

A guest-host liquid crystal composition was prepared in the same manner as in Example 4 except that the content of chiral dopant was adjusted so that the pitch length was 8.6 μm.

A guest-host liquid crystal composition (with a dye content of 1.0 weight % to 1.2 weight %) was prepared in the same manner as in Example 4 except that dichroic dye (1-8) was used.

Production of Guest-Host Liquid Crystal Element

A guest-host liquid crystal element was prepared in the same manner as in Example 4 by using the guest-host liquid crystal composition described above.

By way of comparison, commercially available chiral dopants R-811, R-1011 (trade name, manufactured by Merck & Co., Inc.), CNL-617L and CN (trade name, manufactured by ADEKA Corporation) were used to produce a liquid crystal element in the same manner except that the pitch length was set at a length to maintain a homeotropic orientation.

Evaluation of Contrast Ratio

Contrast ratio was evaluated in the same manner as in Example 4.

TABLE 6

| Chiral Dopant | Dichroic Dye | Pitch Length (μm) | Contrast Ratio | Remark |
|---|---|---|---|---|
| 1 | 1-8 | 8.6 | 7.3 | Present Invention |
| 2 | 1-8 | 8.6 | 6.5 | Present Invention |
| 3 | 1-8 | 8.6 | 8.4 | Present Invention |
| 5 | 1-8 | 8.6 | 8.2 | Present Invention |
| 7 | 1-8 | 8.6 | 6.4 | Present Invention |
| 8 | 1-8 | 8.6 | 6.4 | Present Invention |
| 9 | 1-8 | 8.6 | 6.7 | Present Invention |
| 10 | 1-8 | 8.6 | 6.4 | Present Invention |
| 11 | 1-8 | 8.6 | 7.7 | Present Invention |
| 12 | 1-8 | 8.6 | 7.7 | Present Invention |
| 13 | 1-8 | 8.6 | 7.4 | Present Invention |
| R-811 | 1-8 | 8.9 | 5.7 | Comparative Example |
| R-1011 | 1-8 | 9.2 | 5.5 | Comparative Example |
| CNL-617L | 1-8 | 9.0 | 5.6 | Comparative Example |
| CN | 1-8 | 8.8 | 5.7 | Comparative Example |

TABLE 7

| Chiral Dopant | Dichroic Dye | Pitch Length (μm) | Contrast Ratio | Remark |
|---|---|---|---|---|
| 1 | 1-14 | 8.6 | 7.4 | Present Invention |
| 2 | 1-14 | 8.6 | 6.6 | Present Invention |
| 3 | 1-14 | 8.6 | 8.5 | Present Invention |
| 5 | 1-14 | 8.6 | 8.3 | Present Invention |
| 7 | 1-14 | 8.6 | 6.5 | Present Invention |
| 8 | 1-14 | 8.6 | 6.5 | Present Invention |
| 9 | 1-14 | 8.6 | 6.8 | Present Invention |
| 10 | 1-14 | 8.6 | 6.5 | Present Invention |
| 11 | 1-14 | 8.6 | 7.8 | Present Invention |
| 12 | 1-14 | 8.6 | 7.8 | Present Invention |
| 13 | 1-14 | 8.6 | 7.5 | Present Invention |
| R-811 | 1-14 | 8.9 | 5.8 | Comparative Example |
| R-1011 | 1-14 | 9.2 | 5.6 | Comparative Example |
| CNL-617L | 1-14 | 9.0 | 5.7 | Comparative Example |
| CN | 1-14 | 8.8 | 5.8 | Comparative Example |

As is apparent from Tables 6 and 7, the display contrast ratio of the liquid crystal element of the present invention becomes high. From this, it was confirmed that, due to using the chiral dopant of the present invention, the order parameter of the liquid crystal composition becomes high, and the threshold helical pitch length P at which a homeotropic orientation can be maintained becomes shorter.

What is claimed is:

1. A liquid crystal composition, comprising:

a liquid crystal; and a chiral dopant which is a compound in which a liquid crystalline group represented by the following Formula (1) is bonded to a rigid optically active compound:

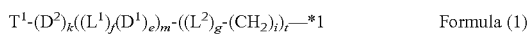  Formula (1)

wherein *1 indicates a bonding position with the optically active compound; $D^1$ and $D^2$ each independently represent an arylene group, a heteroarylene group, or a divalent cyclic aliphatic hydrocarbon group; $L^1$ and $L^2$ each represent a divalent linking group; $T^1$ represents an alkyl group, an alkoxy group, an alkoxy carbonyl group, an acyl group, an acyloxy group, a halogen atom or a cyano group; e represents an integer of from 1 to 3; f represents an integer of from 0 to 2; m represents an integer of from 1 to 3; k represents 1 or 2; g represents 0 or 1; i represents an integer of from 0 to 20; t represents an integer of from 1 to 4; the total number of groups represented by $D^1$ and $D^2$ is an integer of from 2 to 5; when e is 2 or more, the 2 or more of $D^1$ may be the same as or different from each other; when k is 2, the two groups represented by $D^2$ may be the same as or different from each other; when m is 2 or more, the 2 or more of $((L^1)_f\text{-}(D^1)_e)$ may be the same as or different from each other; when f is 2 or more, the 2 or more of $L^1$ represent different linking groups; $(g+i) \times t$ is an integer of from 1 to 40; and when t is 2 or more, the 2 or more of $((L^2)_g\text{-}(CH_2)_i)$ may be the same as or different from each other, wherein the rigid optically active compound is a compound represented by the following Formula (2):

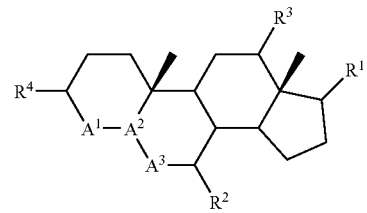

Formula (2)

wherein, in Formula (2), each of $R^1$ to $R^4$ represents a substituent group; at least one of $R^1$, $R^2$, $R^3$ and $R^4$ represents the liquid crystalline group represented by Formula (1); a carbon atom bound to the liquid crystalline group is an asymmetric carbon; $A^1$ to $A^3$ respectively represent a carbon atom; and the bond which connects $A^1$ and $A^2$ and the bond which connects $A^2$ and $A^3$ respectively represent a single bond or a double bond.

2. The liquid crystal composition of claim 1, wherein the chiral dopant is represented by the following Formula (3):

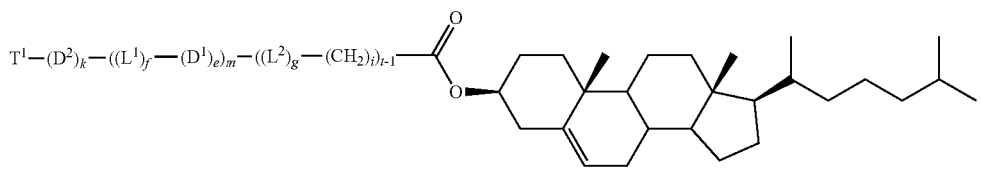

Formula (3)

wherein $D^1$ and $D^2$ each independently represent an arylene group, a heteroarylene group, or a divalent cyclic aliphatic hydrocarbon group; $L^1$ and $L^2$ each represent a divalent linking group; $T^1$ represents an alkyl group, an alkoxy group, an alkoxy carbonyl group, an acyl group, an acyloxy group, a halogen atom or a cyano group; e represents an integer of from 1 to 3; f represents an integer of from 0 to 2; m represents an integer of from 1 to 3; k represents an integer of 1 or 2; g represents 0 or 1; i represents an integer of from 0 to 20; t represents an integer of from 1 to 4; the total number of groups represented by $D^1$ and $D^2$ is an integer of from 2 to 5; when e is 2 or more, the 2 or more of $D^1$ may be the same as or different from each other; when k is 2, the two groups represented by $D^2$ may be the same as or different from each other; when m is 2 or more, the 2 or more of $((L^1)_f$-$(D^1)_e)$ may be the same as or different from each other; when f is 2 or more, the 2 or more of $L^1$ indicate different linking groups; $(g+i) \times t$ is an integer of from 1 to 40; and when t is 3 or more, the 2 or more of $((L^2)_g$-$(CH_2)_i)$ may be the same as or different from each other.

3. The liquid crystal composition of claim 2, wherein the chiral dopant represented by Formula (3) is represented by the following Formula (4) or Formula (5):

6. The liquid crystal composition of claim 5, wherein at least one of the one or more dichroic dyes is a dye having a substituent group represented by the following Formula (6):

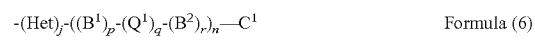

Formula (6)

wherein Het represents an oxygen atom or a sulfur atom; each of $B^1$ and $B^2$ independently represents an arylene group, a hetero-arylene group, or a bivalent cycloaliphatic hydrocarbon group; $Q^1$ represents a bivalent linking group; $C^1$ represents an alkyl group, a cycloalkyl group, an alkoxy group, an alkoxycarbonyl group, an acyl group, or an acyloxy group; j represents 0 or 1; p, q and r each independently represents an integer of from 0 to 5; n represents an integer of from 1 to 3; $(p+r) \times n$ is an integer of from 3 to 10; when p is 2 or more, the two or more of $B^1$ may be the same as or different from each other; when q is 2 or more, the two or more of $Q^1$ may be the same as or different from each other; when r is 2 or more, the two or more of $B^2$ may be the same as or different from each other; and when n is 2 or more, the two or more of $((B^1)_p$-$(Q^1)_q$-$(B^2)_r)$ may be the same as or different from each other.

7. The liquid crystal composition of claim 1, wherein the liquid crystal is a dual frequency driven liquid crystal.

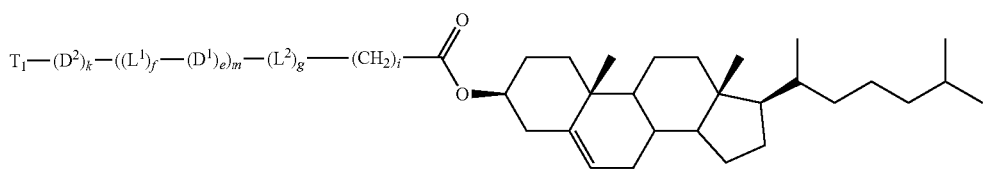

Formula (4)

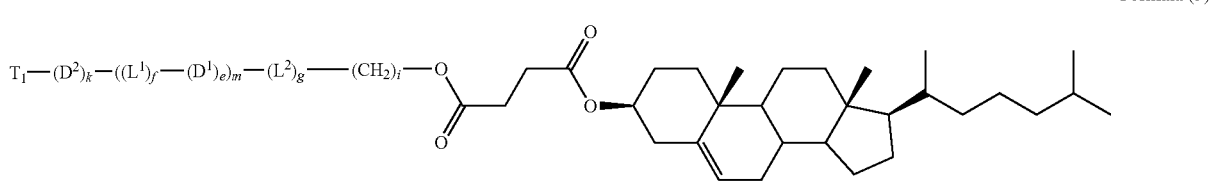

Formula (5)

wherein $D^1$, $D^2$, $L^1$, $L^2$, $T^1$, e, f, m, k, g and i in Formulae (4) and (5) are respectively identical with D1, $D^2$, $L^1$, $L^2$, $T^1$, e, f, m, k, g and i in Formula (3).

4. The liquid crystal composition of claim 1, wherein the liquid crystal is a nematic liquid crystal.

5. The liquid crystal composition of claim 1, further comprising one or more dichroic dyes.

8. A liquid crystal element, comprising:
a pair of electrodes, at least one of the electrodes being a transparent electrode; and
a liquid crystal layer provided between the pair of the electrodes,
the liquid crystal layer comprising the liquid crystal composition of claim 1.

9. A reflective display material comprising a liquid crystal element, wherein the liquid crystal element is the liquid crystal element of claim 8.

10. A light-controlling material comprising a liquid crystal element, wherein the liquid crystal element is the liquid crystal element of claim 8.

11. A method for forming a liquid crystal composition, comprising adding a chiral dopant to a host liquid crystal so as to make the order parameter of the liquid crystal composition higher than that of the host liquid crystal, the chiral dopant comprising a liquid crystalline group represented by the following Formula (1) that is bonded to a rigid optically active compound:

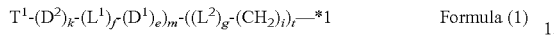

Formula (1)

wherein *1 indicates a bonding position with the optically active compound; $D^1$ and $D^2$ each independently represent an arylene group, a heteroarylene group, or a divalent cyclic aliphatic hydrocarbon group; $L^1$ and $L^2$ each represent a divalent linking group; $T^1$ represents an alkyl group, an alkoxy group, an alkoxy carbonyl group, an acyl group, an acyloxy group, a halogen atom or a cyano group; e represents an integer of from 1 to 3; f represents an integer of from 0 to 2; m represents an integer of from 1 to 3; k represents 1 or 2; g represents 0 or 1; i represents an integer of from 0 to 20; t represents an integer from 1 to 4; the total number of the groups represented by $D^1$ and $D^2$ is an integer of from 2 to 5; when e is 2 or more, the 2 or more of $D^1$ may be the same as or different from each other; when k is 2, the two groups represented by $D^2$ may be the same as or different from each other; when m is 2 or more, the 2 or more of $((L^1)_f\text{-}(D^1)_e)$ may be the same as or different from each other; when f is 2 or more, the 2 or more of $L^1$ represent different linking groups; (g+i)×t is an integer of from 1 to 40; and when t is 2 or more, the 2 or more of $((L^2)_g\text{-}(CH_2)_i)$ may be the same as or different from each other, wherein the rigid optically active compound is a compound represented by the following Formula (2):

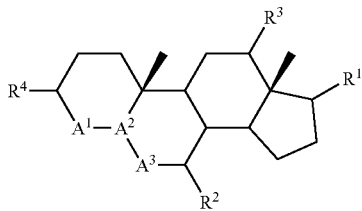

Formula (2)

wherein, in Formula (2), each of $R^1$ to $R^4$ represents a substituent group; at least one of $R^1$, $R^2$, $R^3$ and $R^4$ represents the liquid crystalline group represented by Formula (1); a carbon atom bound to the liquid crystalline group is an asymmetric carbon; $A^1$ to $A^3$ respectively represent a carbon atom; and the bond which connects $A^1$ and $A^2$ and the bond which connects $A^2$ and $A^3$ respectively represent a single bond or a double bond.

12. A method of forming a liquid crystal element comprising a pair of electrodes and a liquid crystal composition provided therebetween, the method comprising:

adding a chiral dopant to a host liquid crystal so as to form the liquid crystal composition having an order parameter which is higher than that of the host liquid crystal; and providing the liquid crystal composition between the pair of electrodes, such that:

at least one electrode of the pair of electrodes is a transparent electrode;

the chiral dopant comprises a liquid crystalline group represented by the following Formula (1) that is bonded to a rigid optically active compound; and the liquid crystalline group represented by Formula (1) is bonded to the rigid optically active compound such that a distance (d) between the pair of electrodes and a helical pitch (P) of the liquid crystal composition satisfy a relationship of $0.1 \leq d/P \leq 3$, when the liquid crystal composition is provided between the pair of electrodes:

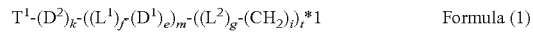

Formula (1)

wherein *1 indicates a bonding position with the optically active compound; $D^1$ and $D^2$ each independently represent an arylene group, a heteroarylene group, or a divalent cyclic aliphatic hydrocarbon group; $L^1$ and $L^2$ each represent a divalent linking group; $T^1$ represents an alkyl group, an alkoxy group, an alkoxy carbonyl group, an acyl group, an acyloxy group, a halogen atom or a cyano group; e represents an integer of from 1 to 3; f represents an integer of from 0 to 2; m represents an integer of from 1 to 3; k represents 1 or 2; g represents 0 or 1; i represents an integer of from 0 to 20; t represents an integer from 1 to 4; the total number of the groups represented by $D^1$ and $D^2$ is an integer of from 2 to 5; when e is 2 or more, the 2 or more of $D^1$ may be the same as or different from each other; when k is 2, the two groups represented by $D^2$ may be the same as or different from each other; when m is 2 or more, the 2 or more of $((L^1)_f\text{-}(D^1)_e)$ may be the same as or different from each other; when f is 2 or more, the 2 or more of $L^1$ represent different linking groups; (g+i)×t is an integer of from 1 to 40; and when t is 2 or more, the 2 or more of $((L^2)_g\text{-}(CH_2)_i)$ may be the same as or different from each other, wherein the rigid optically active compound is a compound represented by the following Formula (2):

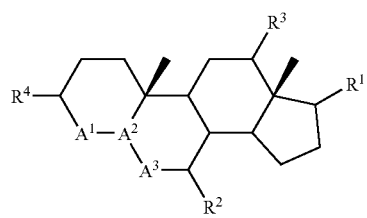

Formula (2)

wherein, in Formula (2), each of $R^1$ to $R^4$ represents a substituent group; at least one of $R^1$, $R^2$, $R^3$ and $R^4$ represents the liquid crystalline group represented by Formula (1); a carbon atom bound to the liquid crystalline group is an asymmetric carbon; $A^1$ to $A^3$ respectively represent a carbon atom; and the bond which connects $A^1$ and $A^2$ and the bond which connects $A^2$ and $A^3$ respectively represent a single bond or a double bond.

* * * * *